US009489656B2

(12) United States Patent
Yoo et al.

(10) Patent No.: US 9,489,656 B2
(45) Date of Patent: Nov. 8, 2016

(54) METHOD AND APPARATUS FOR GENERATING COMMUNITY

(75) Inventors: Seung-Yeol Yoo, Suwon-si (KR); Jeong-Soo Lee, Suwon-si (KR)

(73) Assignee: Samsung Electronics Co. Ltd., Suwon-si (KR)

( * ) Notice: Subject to any disclaimer, the term of this patent is extended or adjusted under 35 U.S.C. 154(b) by 534 days.

(21) Appl. No.: 13/279,063

(22) Filed: Oct. 21, 2011

(65) Prior Publication Data

US 2012/0124083 A1    May 17, 2012

(30) Foreign Application Priority Data

Nov. 12, 2010 (KR) .......................... 10-2010-0112989

(51) Int. Cl.
| | | |
|---|---|---|
| *G06F 17/30* | (2006.01) | |
| *G06Q 10/10* | (2012.01) | |
| *G06Q 10/06* | (2012.01) | |

(52) U.S. Cl.
CPC ....... *G06Q 10/10* (2013.01); *G06Q 10/063112* (2013.01)

(58) Field of Classification Search
CPC .............. G06Q 50/01; G06Q 10/0631; G06Q 10/06311; G06Q 10/063114; G06F 17/30705; G06F 17/30702
USPC ....... 707/736, 737, 738, 748, 749, 751, 769, 707/732, 733, 734; 715/744, 811; 705/319
See application file for complete search history.

(56) References Cited

U.S. PATENT DOCUMENTS

| | | |
|---|---|---|
| 6,675,197 B1 | 1/2004 | Satoh et al. |
| 7,111,008 B2 | 9/2006 | Nomura et al. |
| 2003/0101066 A1 | 5/2003 | Jeanblanc et al. |
| 2008/0172407 A1* | 7/2008 | Sacks .............................. 707/102 |
| 2008/0313262 A1 | 12/2008 | Cho et al. |
| 2009/0030927 A1* | 1/2009 | Cases et al. ................... 707/102 |
| 2010/0153287 A1* | 6/2010 | Holzberg ........................ 705/319 |
| 2010/0293123 A1* | 11/2010 | Barrett et al. ................... 706/13 |
| 2010/0331146 A1* | 12/2010 | Kil ..................................... 482/8 |
| 2012/0214140 A1* | 8/2012 | Brynelsen et al. ............ 600/301 |

FOREIGN PATENT DOCUMENTS

| | | |
|---|---|---|
| CA | 2 757 599 | 10/2010 |
| CN | 101118631 A | 2/2008 |
| CN | 101159703 A | 4/2008 |

(Continued)

OTHER PUBLICATIONS

International Search Report dated May 23, 2012 in connection with International Application No. PCT/KR2011/008666; 3 pages.

Written Opinion of International Searching Authority dated May 23, 2012 in connection with International Application No. PCT/KR2011/008666; 3 pages.

(Continued)

*Primary Examiner* — Vincent Boccio

(57) ABSTRACT

A method and apparatus generate a community based on goals and intentions of its members. Context information related to a first member is collected. A list of goals that the first member wants to accomplish and a list of capabilities that the first member may provide are derived, based on the context information. A search is conducted to find a second member that has at least one of a capability matching at least one goal listed in the list of goals and a goal matching at least one capability listed in the list of capabilities. And then, a community including the first member and the second member is generated.

23 Claims, 22 Drawing Sheets

(56) References Cited

FOREIGN PATENT DOCUMENTS

| | | |
|---|---|---|
| CN | 101710285 A | 5/2010 |
| JP | 2002109025 A | 4/2002 |
| JP | 2005284495 A | 10/2005 |
| JP | 2010152477 A | 7/2010 |
| KR | 20070004407 A | 1/2007 |
| KR | 10-2009-0041745 | 4/2009 |
| KR | 20090035754 A | 4/2009 |
| KR | 20090043743 A | 5/2009 |
| KR | 10-2010-0035037 | 4/2010 |
| KR | 20100035036 A | 4/2010 |
| WO | WO 2009/048193 A1 | 4/2009 |

OTHER PUBLICATIONS

Patent Examination Report No. 1 dated Oct. 9, 2014 in connection with International Application No. 2011326923; 3 pages.

Chinese Office Action dated Aug. 5, 2015 in connection with Chinese Application No. 201180054566.7; 23 pages.

Second Office Action dated Mar. 21, 2016 in connection with Chinese Application No. 201180054566.7; 21 pages.

Extended European Search Report dated Apr. 7, 2016 in connection with European Application No. 11839331.3, 6 pages.

Decision of Rejection dated Sep. 6, 2016 in connection with Chinese Application No. 201180054566.7, 21 pages.

* cited by examiner

METHOD AND APPARATUS FOR GENERATING COMMUNITY

CROSS-REFERENCE TO RELATED APPLICATION(S) AND CLAIM OF PRIORITY

The present application is related to and claims the benefit of Korean Patent Application No. 10-2010-0112989, filed on Nov. 12, 2010, in the Korean Intellectual Property Office, the disclosure of which is incorporated herein in its entirety by reference.

TECHNICAL FIELD OF THE INVENTION

The present invention relates to methods and apparatuses for generating a community, and more particularly, to a method and apparatus for efficiently generating/changing a community by reflecting the goals/intentions of members thereof.

BACKGROUND OF THE INVENTION

Advancement in scientific technologies has enabled specialization and division of labor in service sectors. As such, much attention has been paid to the importance of collaboration, which means working together jointly with respect to a common interest.

In general, for collaboration, a community aiming to achieve a particular goal is preset and members are selected to accomplish the particular goal. However, such a community is not likely to adaptively respond to a change in environments or situations.

SUMMARY OF THE INVENTION

To address the above-discussed deficiencies of the prior art, it is a primary object to provide methods and apparatuses for generating a community, and more particularly, a method and apparatus for generating/changing a community by reflecting goals/intentions of members thereof.

According to an aspect of the present invention, there is provided a method of generating a community. Context information related to a first member is collected. A list of goals that the first member wants to accomplish and a list of capabilities that the first member may provide are derived, based on the context information. A search is conducted to find a second member that has a capability matching at least one goal listed in the list of goals or a goal matching at least one capability listed in the list of capabilities. And a community including the first member and the second member is generated.

According to another aspect of the present invention, there is provided an apparatus for generating a community. The apparatus includes a context information collector, a list deriving unit, a search unit, and a community generator. The context information collector collects context information related to a first member. The list deriving unit for derives a list of goals that the first member wants to accomplish and a list of capabilities that the first member may provide, based on the context information. The search unit searches for a second member that has a capability matching at least one goal listed in the list of goals or a goal matching at least one capability listed in the list of capabilities. And the community generator generates a community including the first member and the second member.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged computer device. First, the terms used in the present specification will be defined for convenience of explanation.

The term 'community' means a set of members that work together jointly with respect to a common interest. The term 'community' is a concept including a group of people in a real world environment, a group of entities that provide services in a computing environment, and so on.

The term 'member' means a subject that belongs to a community and works together in collaboration. One member may provide a predetermined function or service to another member or may receive a predetermined function or service from another member. The term 'member' is a concept including a person, various entities in a computing environment, objects, entities, places, and so on.

The term 'context information' is a type of factual information related to a member, and particularly, factual information related to the attributes of the member.

The term 'situational information' is information obtained by analyzing context information and denotes a situation of a member. The situational information may be a context itself or relationship information between contexts.

The term 'goal' means an outcome or requirements that a member wants to accomplish in a particular situation.

The term 'capability' means a function or service that a member may provide to another member in a particular situation.

The term 'knowledge base' (hereinafter referred to as 'KB') means a database that stores specialized knowledge accumulated through intellectual activities or experiences of experts in a particular field or facts and rules for solving problems.

Hereinafter, embodiments of the present invention will be described in detail with reference to the accompanying drawings.

Figure 1:
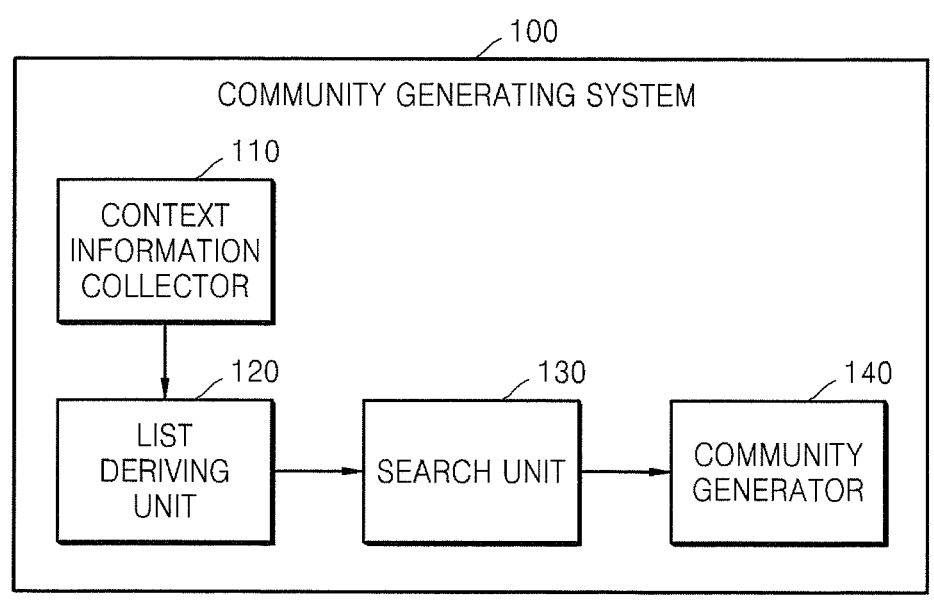
FIG. 1 is a block diagram of a community generating system according to an embodiment of the present invention.

FIG. 1 is a block diagram of a community generating system 100 according to an embodiment of the present invention. For convenience of explanation, an operation of the community generating system 100 will be described with respect to a first member from among a plurality of members that may join a community.

The community generating system 100 includes a context information collector 110, a list deriving unit 120, a search unit 130, and a community generator 140, which may be implemented in one or more physical components. Alternatively, the context information collector 110, the list deriving unit 120, the search unit 130, and the community generator 140 may be implemented in one or more modules of the community generating system 100 which is stored in memory such that its operations are processed by a controller.

The context information collector 110 collects context information related to the first member. The context information collector 110 collects information related to attributes of the first member as the context information from among a plurality of pieces of factual information associated with the first member. The context information is used as input information for determining a situational model corresponding to the first member, based on a situational model KB that will be described in detail later.

The context information collector 110 collects context information related to the first member at predetermined time intervals and determines whether previous context information changes.

The list deriving unit 120 derives a list of goals that the first member wants to accomplish and a list of capabilities that the first member may provide, based on the context information.

Although not shown, the list deriving unit 120 may include a situational model determiner and a deriving unit.

The situational model determiner can access the situational model KB that defines situational models according to a combination of at least one piece of context information. The situational model determiner determines a situational model corresponding to the first member, based on the context information and the situational model KB regarding the first member.

The deriving unit may access an entity mode KB that defines goals and capabilities of the members according to a combination of at least one piece of context information. The deriving unit derives the list of goals that includes goals that the first member wants to accomplish and the list of capabilities that includes services and functions that the first member may provide, based on the situational model corresponding to the first member and the entity model KB.

The search unit 130 searches for a second member that may form a community together with the first member. The second member is a member that either has a capability to accomplish at least one goal listed in the list of goals of the first member or has a goal that may be accomplished by at least one capability listed in the list of capabilities of the first member. The search unit 130 may access a goal/capability matching KB that represents a matching (e.g. corresponding) relationship between a goal and a capability for accomplishing the goal. The search unit 130 may search for the second member, based on the goal/capability matching KB.

The community generator 140 generates the community to which the first member and the second member belong.

Although not shown, the community generator 140 may include a candidate community generator and a determiner.

The candidate community generator generates one or more candidate communities to which the first member and the second member belong.

The determiner selects one of the candidate communities as a final community.

The determiner may determine a final community in various ways. Two ways, one of which the determiner may use to determine a final community, are as follows (but the present invention is not limited thereto):

(i) The determiner proposes candidate communities to the first member (or a user of the first member) and leads the first member to select one of the candidate communities. In this situation, information regarding the candidate communities, e.g., the goals of the candidate communities, information regarding members thereof, and the advantages and disadvantages of the candidate communities, may be presented together with the candidate communities. If the first member selects one of the candidate communities, the determiner determines the selected community as a final community; and (ii) The determiner determines a final community based on community policy information that is preset without a user's input. The community policy information specifies regulations that the determiner should consider in selecting a final community. The community policy information may be preset by the user or may be automatically set according to external situations.

The determiner may determine the final community, in consideration of at least one from among the degree of achievement of goals of members belonging to each candidate community, the degree of achievement of a goal of a particular member belonging to each candidate community, the total number of members of each candidate community, the total number of goals to be achieved in each candidate community, the total number of goals that cannot be achieved in each candidate community, a possibility of a contention between each candidate community and another community occurring, and a possibility of each candidate community collapsing.

Figure 2:
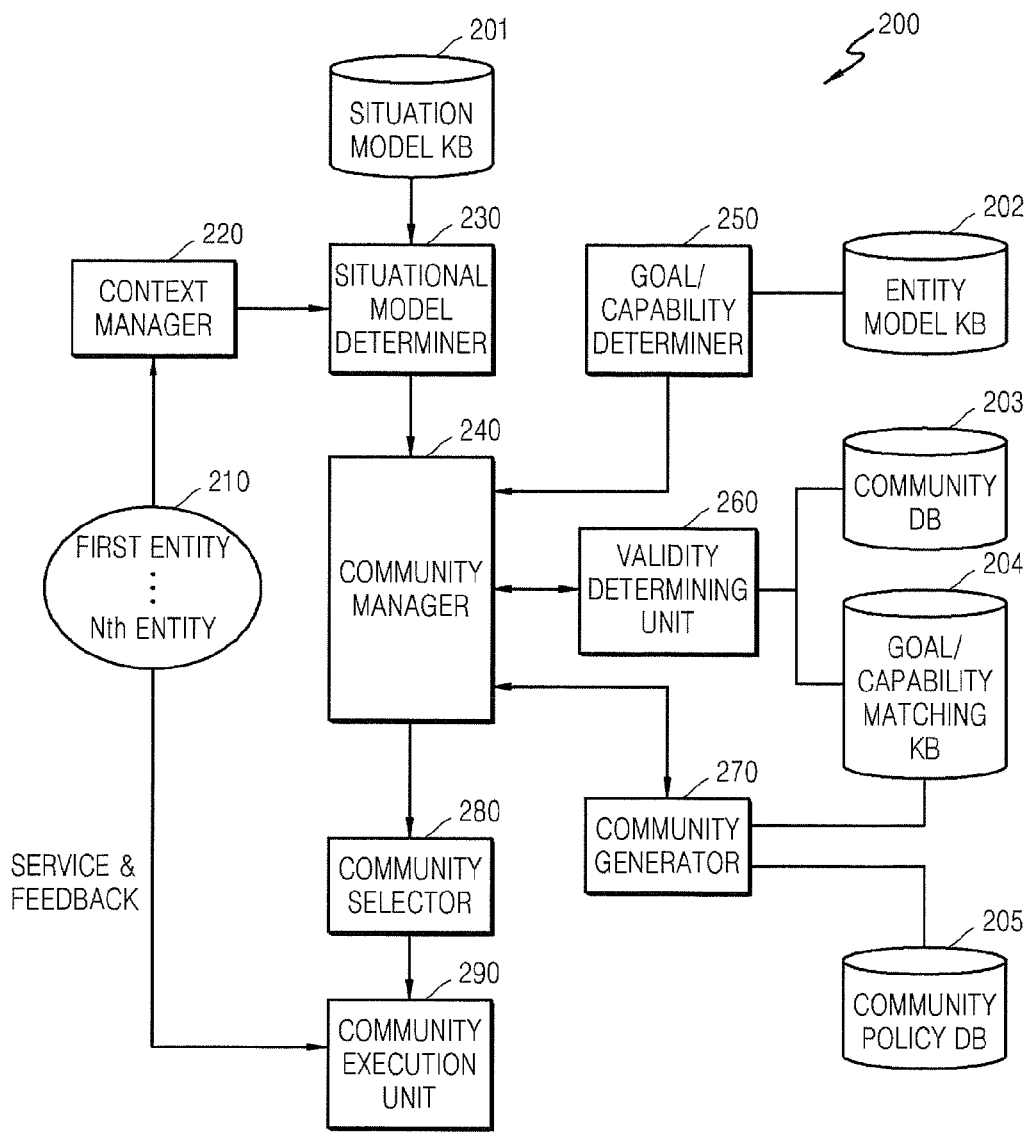
FIG. 2 is a block diagram of a community generating system according to an embodiment of the present invention.

FIG. 2 is a block diagram of a community generating system 200 according to another embodiment of the present invention.

The community generating system 200 includes a context manager 220, a situational model determiner 230, a community manager 240, a goal/capability determiner 250, a validity determining unit 260, a community generator 270, a community selector 280, and a community execution unit 290, which may be implemented in one or more physical components. Alternatively, the context manager 220, situational model determiner 230, community manager 240, goal/capability determiner 250, validity determining unit 260, community generator 270, community selector 280, and community execution unit 290 may be implemented in one or more modules of the community generating system 200 which is stored in memory such that its operations are processed by a controller.

The context manager 220 obtains context information regarding members. The context manager 220 obtains information regarding the members periodically or under a particular condition by using a sensor so as to update the context information. The context manager 220 transmits the context information to the situational model determiner 230.

The situational model determiner 230 determines a situational model of each of the members based on the context information. A situational model KB 201 defines the situational model of each of the members according to a combination of at least one piece of context information. The situational model determiner 230 infers a situation of each of the members, based on the situational model KB 201. The determined situational model is provided to the community manager 240.

The community manager 240 learns a goal and capability of each of the members, based on the corresponding situational model. The community manager 240 generates/updates an optimal community based on the goal and capability of each of the members, such that members belonging to the community may work together jointly to efficiently achieve a goal. The community manager 240 controls the goal/capability determiner 250, the validity determining unit 260, the community generator 270, the community selector 280, and the community execution unit 290.

The goal/capability determiner 250 determines a goal and capability (a function or a service) of each of the members, based on the situational model. The goal/capability determiner 250 may generate a list of goals and a list of capabilities of the members, based on an entity model KB 202. The entity model KB 202 defines goals and capabilities that members registered at a domain (or in a community) may have, and particularly, goals and capabilities that the members may have in a particular situational model. In this situation, the domain is a concept that includes not only a physical space but also a virtual space, e.g., the Internet.

The validity determining unit 260 checks the validity of at least one community. Operations of the validity determining unit 260 are largely classified into but are not limited to, the following three operations.

(i) The validity determining unit 260 determines whether there will be contention between the existing community and a new community that is to be generated using the community generator 270 which will be described in detail later. An example of such a contention may occur when the same member belongs to both the existing community and the new community to be generated. If the contention occurs, the validity determining unit 260 considers priorities assigned to the new community and the existing community, and cancels the generating the new community or informs the community generator 270 of the contention so as to generate the new community. In general, higher priority is assigned to the existing community than to a new community;

(ii) The validity determining unit 260 determines validity of a community to which a member belongs when a situational model of the member changes. If a change in the situational model prevents the community from achieving its goal or causes a contention between the community and another community, then the validity determining unit 260 cancels the community or informs the community generator 270 of the contention such that the community generator 270 may change the community; and (iii) The validity determining unit 260 adds a community, the validity of which is acknowledged to a community database (DB) 203 or cancels a community, the validity of which is not acknowledged from the community DB 203.

The community generator 270 generates a community that includes a particular member and a member with the capability to achieve a goal of the particular member by using a goal/capability matching KB 204. The community generator 270 may further use a community policy DB 205 in generating the community. The community policy DB 205 defines conditions that should be considered in generating the community. For example, the conditions may include at least one from among whether the goal of the particular member is to be satisfied, whether benefits of all members are to be maximized, whether damages that all the members that may suffer are to be minimized, and whether a possibility of a contention between the community and another community occurring is to be minimized, as the conditions that should be considered in generating the community. According to an embodiment, each KB and DB may be stored in one or more storage devices (not illustrated).

The community selector 280 determines a final community from among candidate communities generated by the community generator 270. The community selector 280 may provide the members with a list of candidate communities together with information regarding the candidate communities such that the members may select a desired community.

The community execution unit 290 may plan services to be executed in the community, sets service priorities, and controls the execution of the services such that the goal of the community may be achieved.

Figure 3:
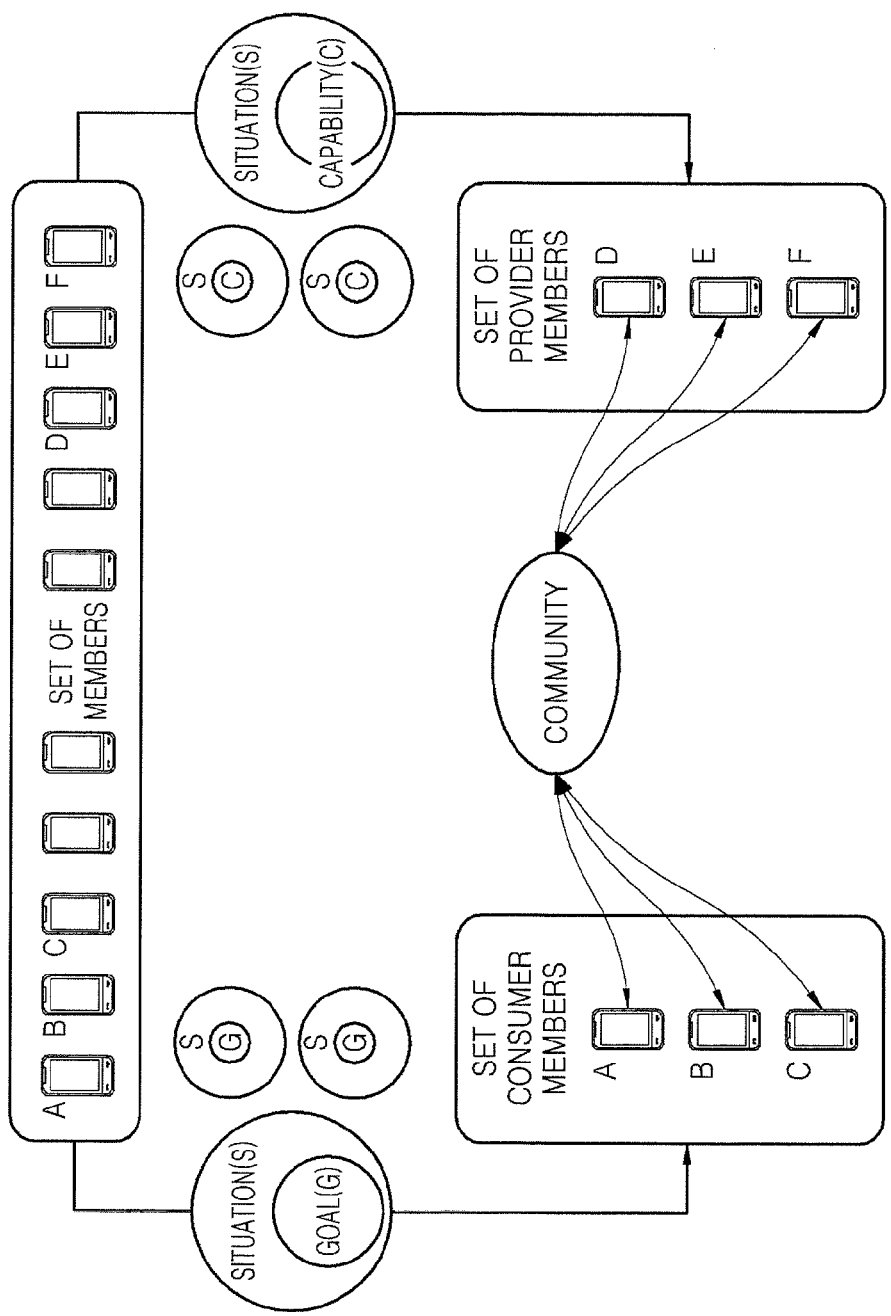
FIG. 3 is a diagram illustrating a process of generating a community by using the community generating system of FIG. 1, according to an embodiment of the present invention.

FIG. 3 is a diagram illustrating a process of generating a community by using the community generating system 100 of FIG. 1, according to an embodiment of the present invention. The community generating system 100 determines a situational model of at least one member included in a set of members that may join a community. Also, the community generating system 100 generates a list of goals and a list of capabilities of the at least one member.

The community generating system 100 generates a community that includes a particular member and another member with the capability to achieve a goal of the particular member.

Figure 4:
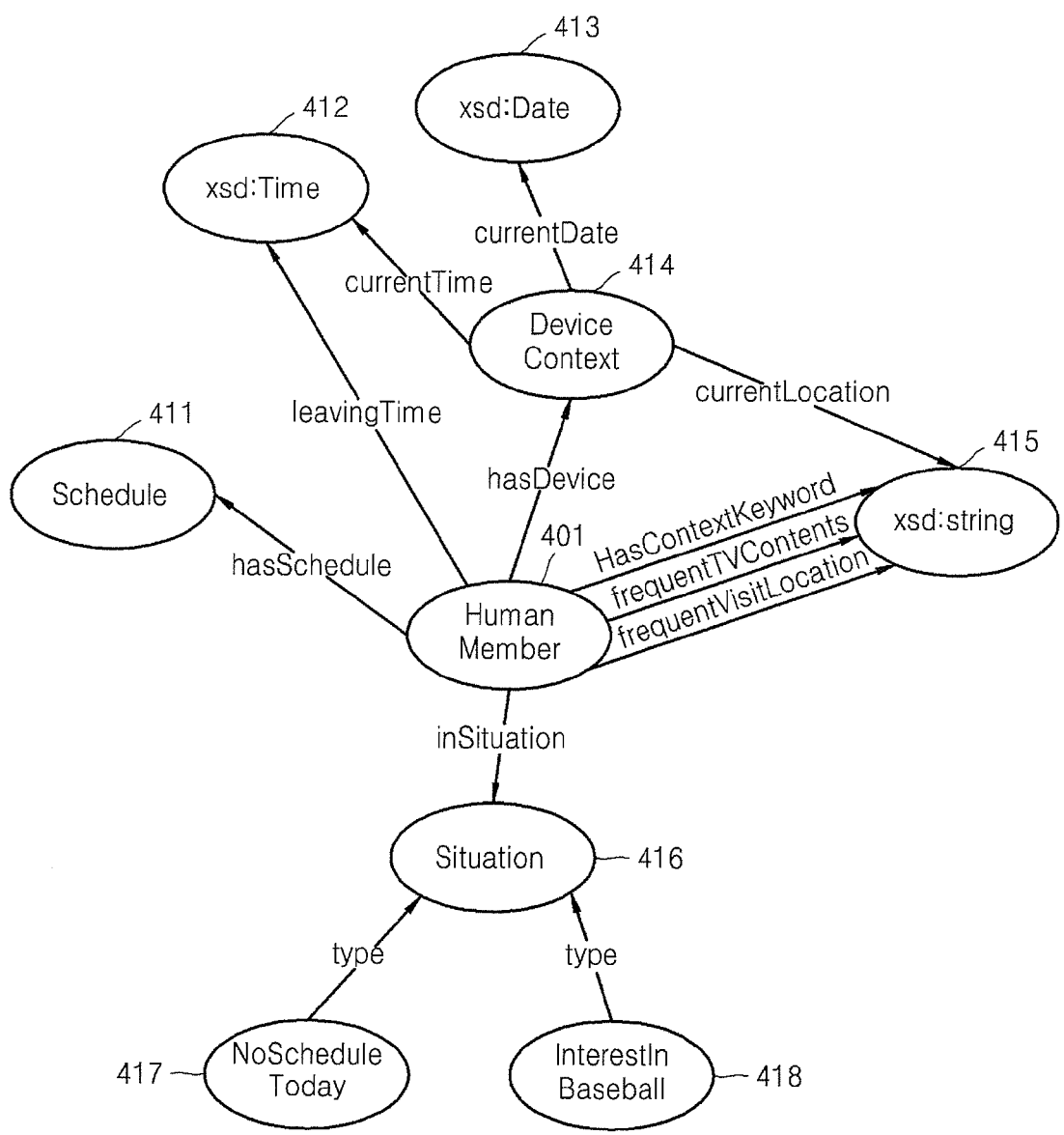
FIG. 4 illustrates an ontology model that represents context information according to an embodiment of the present invention.

FIG. 4 illustrates an ontology model that represents context information according to an embodiment of the present invention. The ontology model represents agreed knowledge conceptually and in a form that may be manipulated using a computer, whereby types or restricting conditions of concepts or objects may be explicitly defined.

The ontology model consists of classes, instances, relationships, attributes, and so on.

In general, the term 'class' indicates a name assigned to, for example, an object or a concept.

The term 'instance' means either a concrete example of an object or a concept, or an object that is substantially embodied.

The term 'attribute' is a particular value assigned to a class or an instance so as to represent the properties or propensities of the class or the instance.

The term 'relationship' is a general term of the relationships between a class, an instance, and an attribute.

In FIG. 4, an oval or a quadrangle denotes a class, and an arrow denotes the relationship between classes or between attributes of the classes. For example, FIG. 4 includes a 'Human Member' class 401, a 'Schedule' class 411, an 'xsd:Time' class 412, an 'xsd:Date' class 413, a 'Device Context' class 414, an 'xsd:string' class 415, a 'Situation' class 416, a 'NoSchedule Today' class 417, and an 'InterestIn Baseball' class 418.

Referring to FIG. 4, a 'Human Member' class 401 and a 'Device Context' class 414 are connected via an arrow named 'hasDevice'. This means that a device that the 'Human Member' class 401 has is the 'Device Context' class 414.

Similarly, the 'Device Context' class 414 and an 'xsd: Time' class 412 are connected via an arrow named 'current-Time'. This means that a current time of the 'Device Context' class 414 is 'xsd:Time'.

In FIG. 4, the information represented using the relationship between classes or between attributes of classes may be the context information described above.

Figure 5:
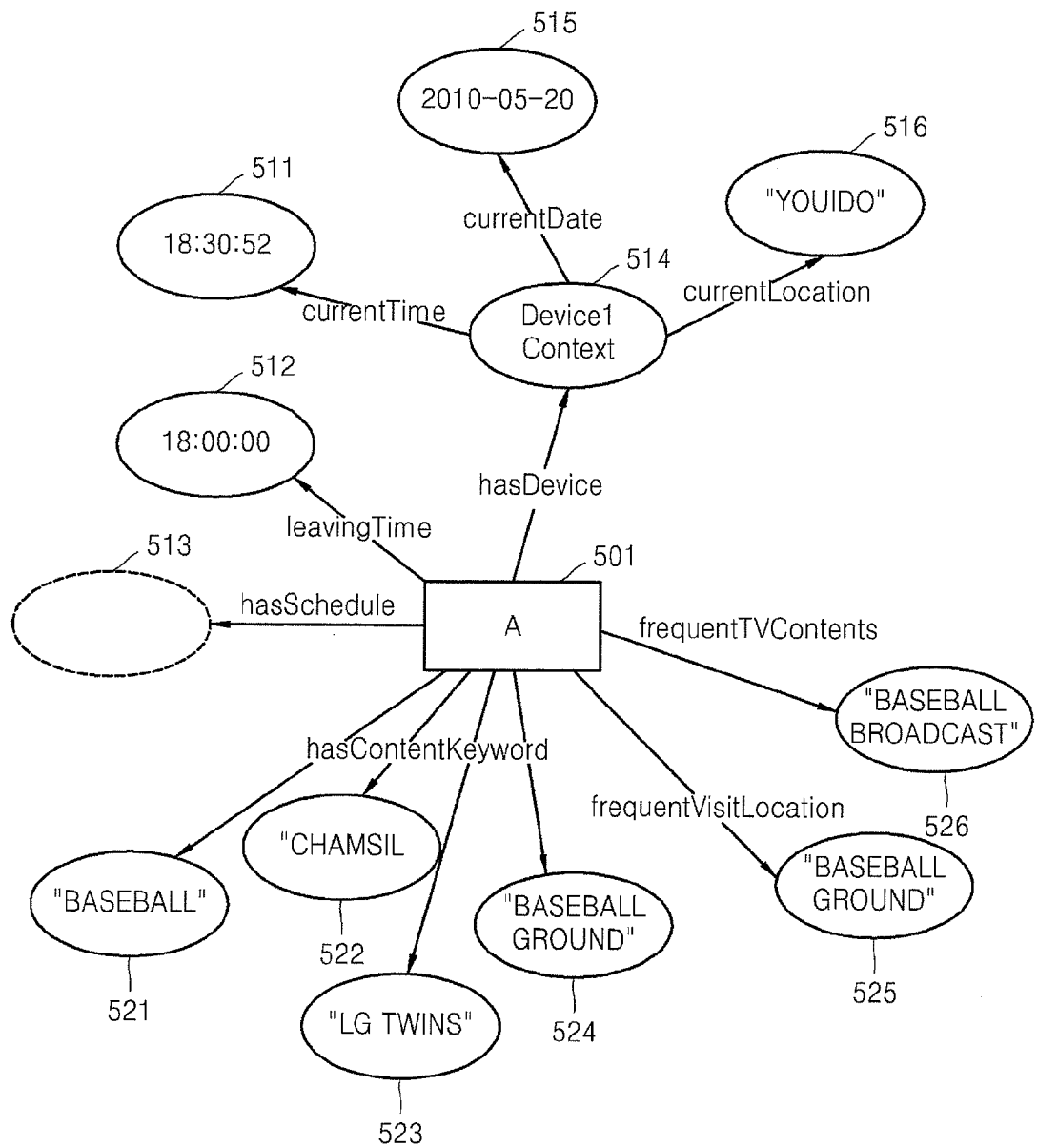
FIG. 5 illustrates an ontology model that represents context information regarding a member A, according to an embodiment of the present invention.

FIG. 5 illustrates an ontology model that represents context information regarding a member A 501, according to an embodiment of the present invention.

The context information regarding the member A 501 includes the following classes:

i) A 'Device 1' class 514: a device that the member A 501 has;

ii) A 'Youido' class 516: current location of the member A 501;

iii) A '2010-05-20' class 515: a current date;

iv) An '18:30:52' class 511: a current time;

v) An '18:00:00' class 512: a leaving time;

vi) A blank class 513: no schedule is set today;

vii) A 'baseball' class 521, a 'Jamsil' class 522, an 'LG Twins' class 523, and a 'baseball ground' class 524: searched keywords;

viii) A 'baseball ground' class 525: a place that is frequently visited; and ix) A 'baseball broadcast' class 526: content that is frequently viewed.

Figure 6:
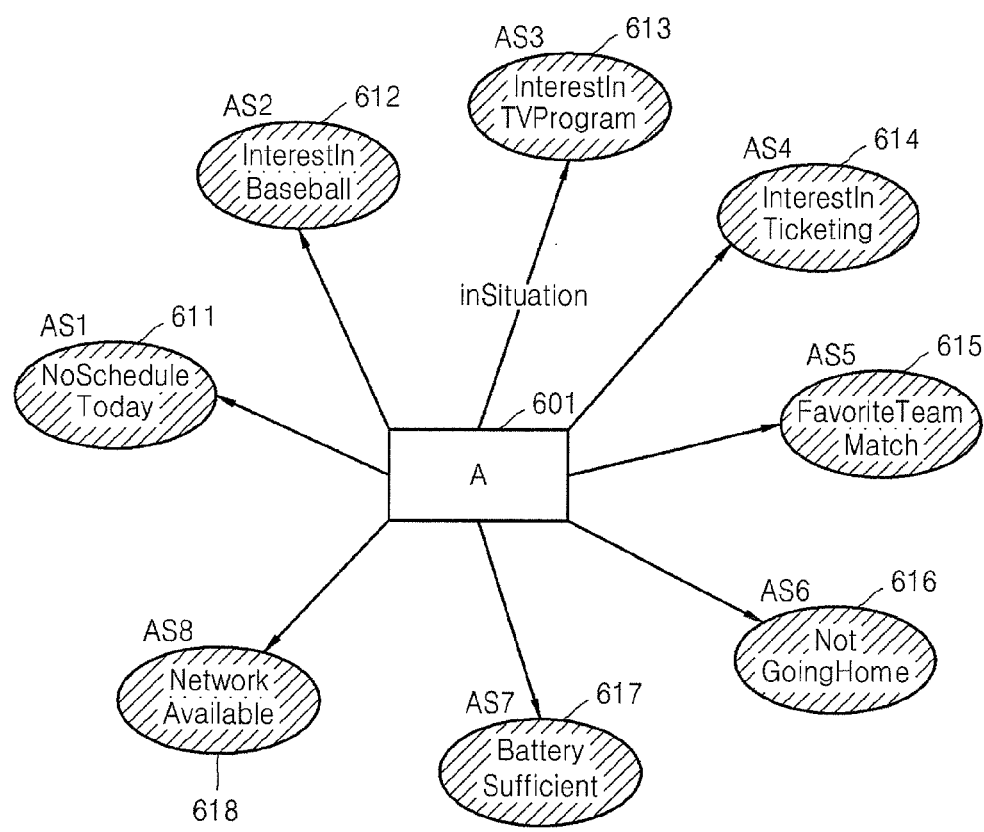
FIG. 6 is a diagram illustrating a process of determining a situational model based on the context information illustrated in FIG. 5, according to an embodiment of the present invention.

FIG. 6 is a diagram illustrating a process of determining a situational model based on the context information illustrated in FIG. 5, according to an embodiment of the present invention.

A situational model of a member A 601 is determined based on the context information thereof and a situational model KB.

As described above, the situational model KB defines a situational model according to a combination of at least one piece of context information. The following tables 1 and 2 show examples of the situational model KB.

TABLE 1

| Situation context information | Situation 1 (no schedule is set today) mem:hasDevice(?member,?device) and cs:currentTime(?device,?cur_t) and cs:leavingTime(?member,?leave_t) and swrlb:laterThan(?cur_t,?leave_t) and Count( cs:hasSchedule(?member,?schedule) ) < 1 |
|---|---|
| conclusion | cs:inSituation(?member,cs:NoScheduleToday) |

Referring to Table 1, the situational model determiner 230 of FIG. 2 may infer that the member A 601 has no schedule today, based on the context information, e.g., the '18:30:52' 511 (current time), the '18:00:00' 512 (leaving time), the blank class 513 (no schedule is set today). That is, that 'having no schedule set today' is the situational model of the member A.

TABLE 2

| situation context information | Situation 2 (baseball is interesting) (cs:hasContextKeyword(?member,"baseball") or cs:hasContextKeyword(?member,"baseball ground")) and (cs:frequentVisitLocation(?member,"baseball ground") or cs:frequentTVContexts(?member,"baseball broadcast") ) |
|---|---|
| Conclusion | cs:inSituation(?member,gc:InterestInBaseball) |

Referring to Table 2, the list deriving unit 120 of FIG. 1 may infer that the member A 601 is interested in baseball, based on the context information, e.g., the 'baseball' class 521 and the 'baseball ground' class 524 (searched keywords), the 'baseball ground' class 525 (place that is frequently visited), and the 'baseball broadcast' class 526 (content that is frequently viewed). That is, that 'being interested in baseball' is determined as the situational model of the member A.

A situation in which the list deriving unit 120 determines the situational model of the member A 601 based on the context information regarding the member A 601 and the situational model KB, is as follows:

TABLE 3

| Situation ID | Situation |
|---|---|
| AS1 611 | No schedule is set today |
| AS2 612 | Interested in baseball |
| AS3 613 | Interested in TV programs |
| AS4 614 | Interested in ticketing |
| AS5 615 | A match of a favorite team is scheduled |
| AS6 616 | Does not want to go home now |
| AS7 617 | Battery power is sufficient |
| AS8 618 | A network is available |

Figure 7:
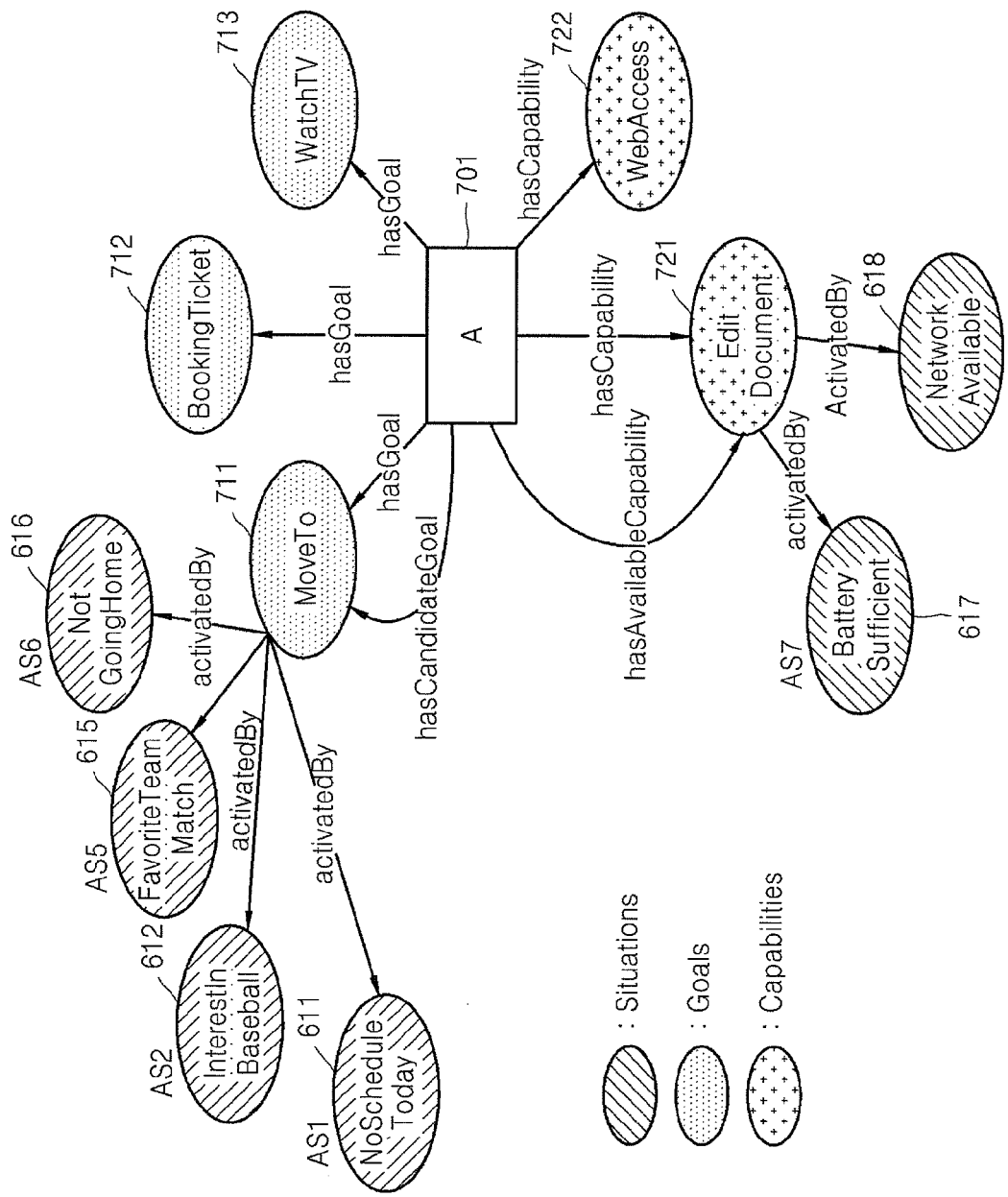
FIG. 7 is a diagram illustrating a process of deriving a list of goals/capabilities based on the situational model determined in the process of FIG. 6, according to an embodiment of the present invention.

FIG. 7 is a diagram illustrating a process of deriving a list of goals/capabilities based on the situational model determined in the process of FIG. 6, according to an embodiment of the present invention.

The entity model KB 202 of FIG. 2 stores a list of goals/capabilities that members may have. The goal/capability determiner 250 of FIG. 2 determines a goal/capability to be activated according to a situational model of each model.

Table 4 illustrates an example of a determined list of goals/capabilities of each member to be activated or deactivated based on the entity model KB 202, according to an embodiment of the present invention.

TABLE 4

| | Goal |
|---|---|
| Condition | forall(gc:activatedBy(?goal,?situation)) |
| | cs:inSituation(?member,?situation) |
| Conclusion | gc:hasCandidate Goal(?member,?goal) |
| | Capability |
| Condition | forall(gc:activatedBy(?capability,?situation)) |
| | cs:inSituation(?member,?situation) |
| Conclusion | gc:hasAvailableCapability(?member,?capability) |

Referring to Table 4, the goal/capability determiner 250 determines goals/capabilities to be activated based on a combination of situational models of members.

Referring to FIG. 7, the list deriving unit 120 of FIG. 1 determines a 'Move to' class 711 as a goal of a member A 701, based on a combination of AS1 611, AS2 612, AS5 615, and AS6 616. Also, the list deriving unit 120 determines an 'Edit Document' class 721 as a capability of the member A 701, based on a combination of an AS7 617 and an AS8 618.

Likewise, the list deriving unit 120 determines the 'MoveTo' class 711, a 'BookingTicket' class 712, and a 'WatchTV' class 713 as goals of the member A 701, and determines the 'Edit Document' class 721 and a 'WebAccess' class 722 as capabilities of the member A 701.

Figure 8:
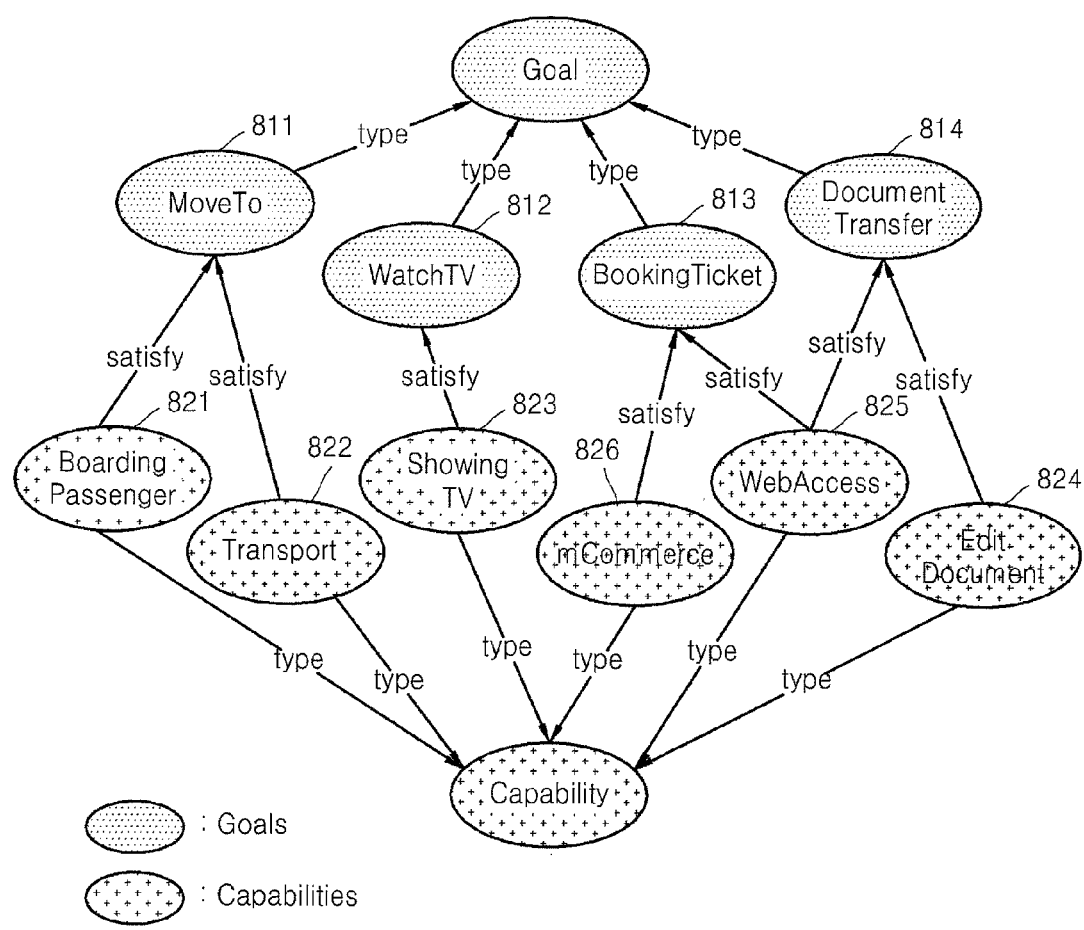
FIG. 8 is a diagram illustrating a process of matching goals and capabilities defined in a goal/capability matching knowledge base (KB) of FIG. 2 with one another, according to an embodiment of the present invention.

FIG. 8 is a diagram illustrating a process of matching goals and capabilities defined in the goal/capability matching KB 204 of FIG. 2 with one another, according to an embodiment of the present invention.

In FIG. 8, a 'MoveTo' class 811 denotes that movement to another location is a goal.

A 'WatchTV' class 812 denotes that watching TV is a goal.

A 'BookingTicket' class 813 denotes that booking a ticket is a goal.

A 'Document Transfer' class 814 denotes that document transfer is a goal.

A 'boarding passenger' class 821 denotes the capability of providing a vacant seat to a passenger.

A 'Transport' class 822 denotes being capable of transportation.

A 'Showing TV' class 823 denotes being capable of showing TV.

An 'Edit Document' class 824 denotes being capable of editing a document.

A 'WebAccess' class 825 denotes being capable of accessing a website.

An 'mCommerce' class 826 denotes being capable of using electronic commerce.

The goal/capability matching KB 204 includes mapping information between each class corresponding to a goal and each class corresponding to a capability for achieving the goal.

Referring to FIG. 8, the 'MoveTo' class 811 can match with the 'boarding passenger' class 821 and the 'Transport' 822 class.

The 'watchTV' class 812 matches with the 'Showing TV' class 823.

The 'BookingTicket' class 813 matches with a combination of the 'mCommerce' class 826 and the 'WebAccess' class 825.

The 'Document Transfer' class 814 can match with a combination of the 'WebAccess' class 825 and the 'Edit Document' class 824.

Figure 9:
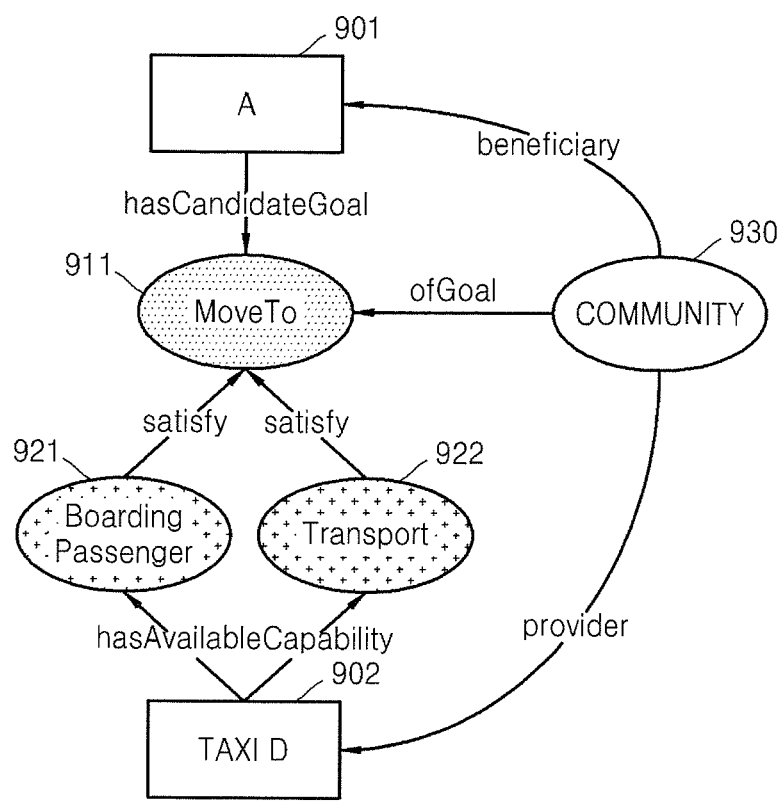
FIG. 9 is a diagram illustrating a process of generating a community based on the list of goals/capabilities illustrated in FIG. 7, according to an embodiment of the present invention.

FIG. 9 is a diagram illustrating a process of generating a community based on the list of goals/capabilities illustrated in FIG. 7, according to an embodiment of the present invention.

A goal of a member A 901 is represented with a 'MoveTo' class 911. That is, the member A 901 has a goal to move to another location.

Capabilities of a member Taxi D 902 are represented with a 'Boarding Passenger' class 921 and a 'Transport' class 922. That is, the member Taxi D 902 is capable of providing a transportation service.

Referring to FIG. 8, the 'MoveTo' class 911 representing movement to another location matches with the 'Boarding Passenger' class 921 and the 'Transport' class 922. Because the transportation service of the member Taxi D class 902 enables the member A 901 to achieve the goal thereof, the member Taxi D class 902 and the member A 901 may belong to the same community.

The community generator 270 of FIG. 2 generates a community 930 to which the member A 901 and the member Taxi D 902 belong.

Figure 10:
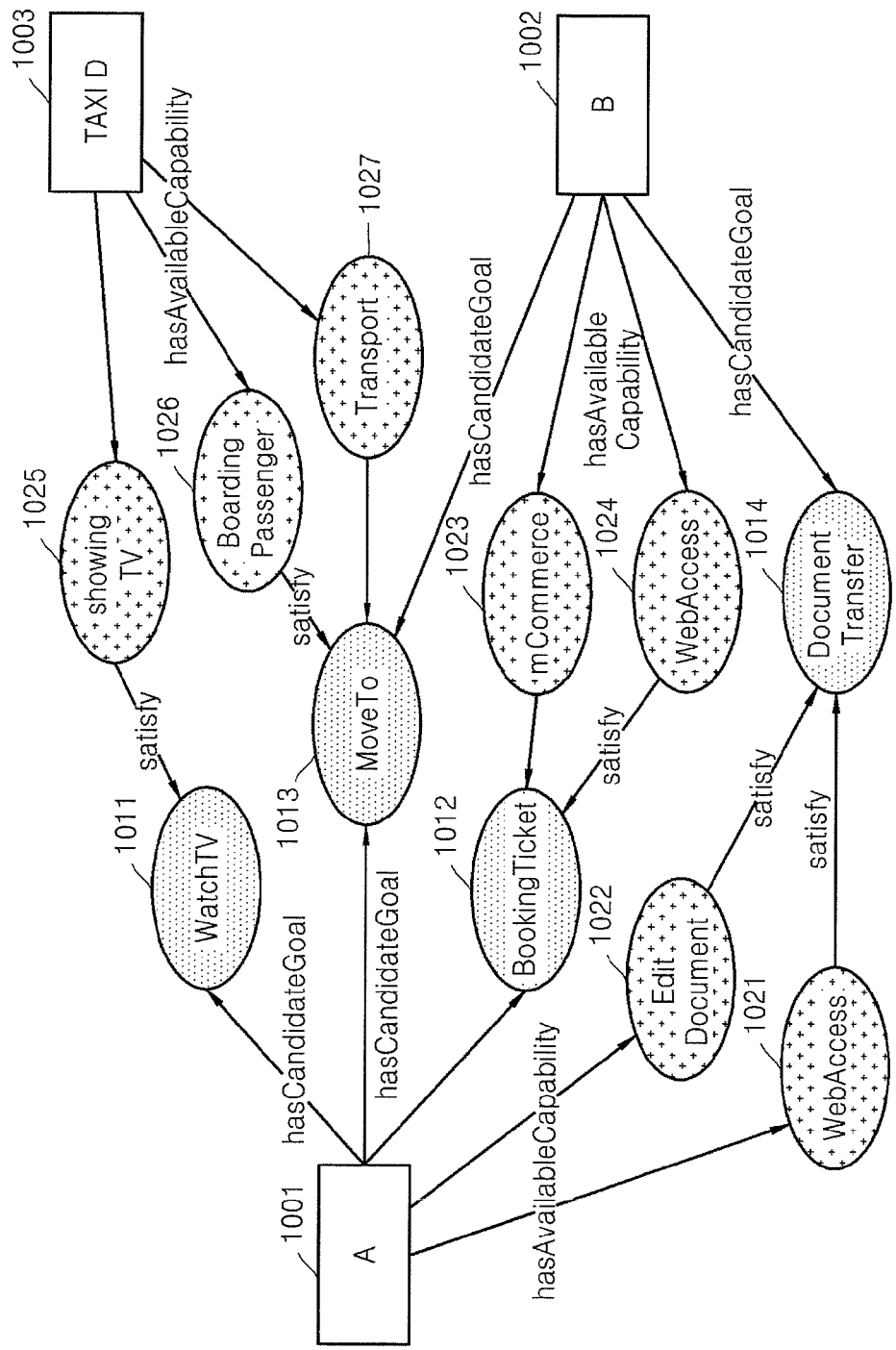
FIG. 10 is a diagram illustrating a process of generating a community based on a list of goals/capabilities of a member A, a member B, and a member Taxi D, according to an embodiment of the present invention.

FIG. 10 is a diagram illustrating a process of generating a community based on a list of goals/capabilities of a member A 1001, a member B 1002, and a member Taxi D 1003, according to an embodiment of the present invention.

Table 5 illustrates a list of goals/capabilities of the member A 1001, the member B 1002, and the member Taxi D 1003, according to an embodiment of the present invention.

TABLE 5

| Member | Goal List | Capability List |
| --- | --- | --- |
| A | AG1: move to Chamsil baseball ground<br>AG2: ticketing<br>AG3: watch a TV | AC1: document editing<br>AC2: web accessing |
| B | BG1: move to Chamsil baseball ground<br>BG2: transfer a document | BC1: electronic commerce<br>BC2: web accessing |
| Taxi D | | DC1: boarding of passengers<br>DC2: transportation<br>DC3: showing TV |

Referring to FIG. 10, a 'MoveTo' class 1013 that is a goal of both the member A 1001 and the member B 1002 may be achieved by a 'Transport' class 1027 that is a capability of the member Taxi D 1003.

A 'BookingTicket' class 1012 that is another goal of the member A 1001 may be achieved by an 'mCommmerce' class 1023 that is a capability of the member B 1002.

A 'Document Transfer' class 1014 that is another goal of the member B 1002 may be achieved by an 'Edit Document' class 1022 that is a capability of the member A 1001.

A 'WatchTV' class 1011 that is another goal of the member A 1001 may be achieved with a 'showing TV' class 1025 that is a capability of the member Taxi D 1003.

That is, if a community which the member A 1001, the member B 1002, and the member Taxi D 1003 may join is generated, then the goals of the member A 1001, the member B 1002, and the member Taxi D 1003 may be satisfied.

Figure 11:
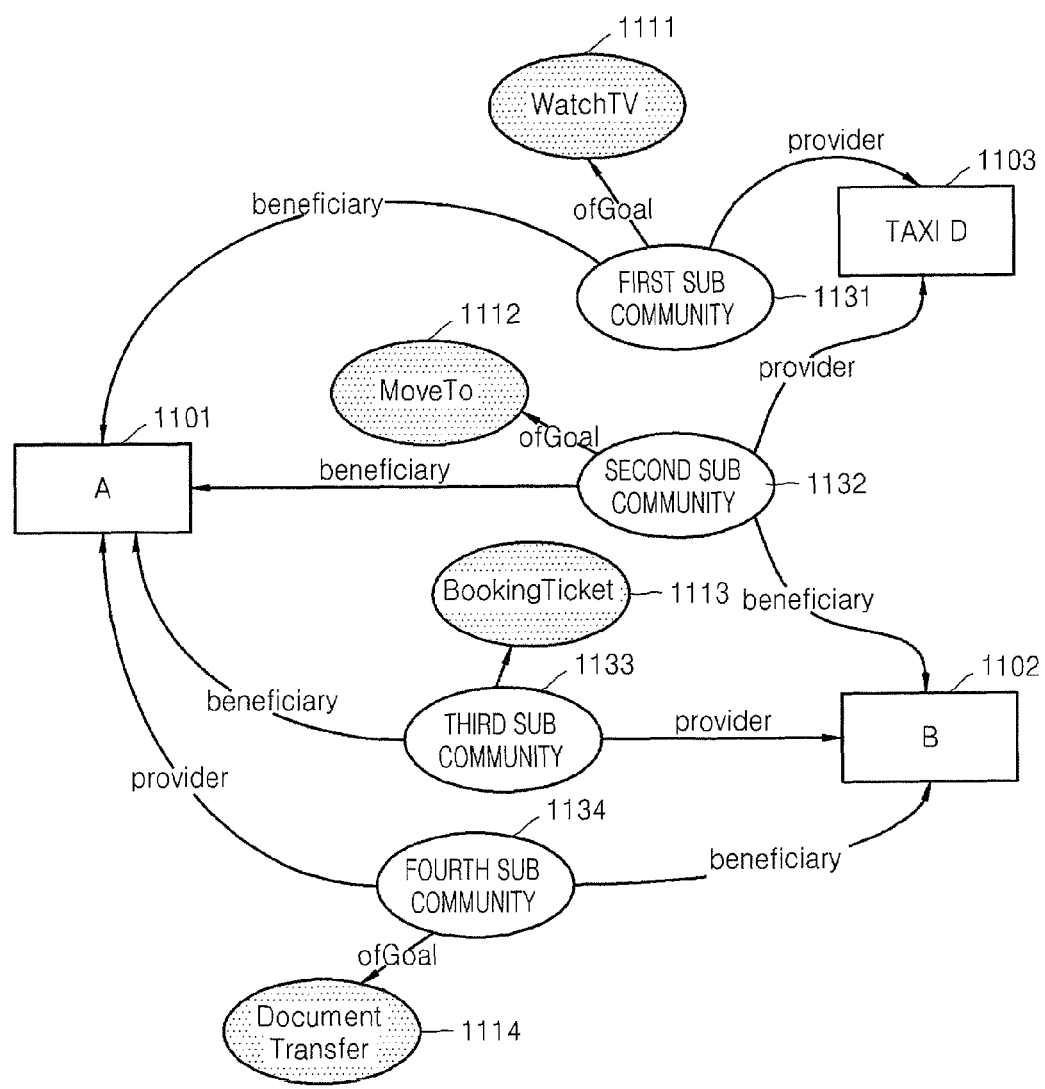
FIG. 11 is a diagram of a community to be generated in the process of FIG. 10 by using a plurality of sub communities, according to an embodiment of the present invention.

FIG. 11 is a diagram illustrating a community to be generated in the process of FIG. 10, by using a plurality of sub communities, according to an embodiment of the present invention. This community may accomplish four goals and may thus be classified into, for example, first to fourth sub communities 1131 to 1134 for accomplishing the four goals, respectively.

The first sub community 1131 includes a member Taxi D 1103 and a member A 1101 and has a goal to watch TV. In the first sub community 1131, the member Taxi D 1103 is a service provider that provides services and the member A 1101 is a service consumer that is provided with the services.

The second sub community 1132 includes the member A 1101, a member B 1102, and a member Taxi D 1103 and has a goal to move to another location. In the second sub community 1132, the member Taxi D 1103 is a service provider and the member A 1101 and the member B 1102 are service consumers.

The third sub community 1133 includes the member A 1101 and the member B 1102 and has a goal to book a ticket. In the third sub community 1133, the member B 1102 is a service provider and the member A 1101 is a service consumer.

The fourth sub community 1134 includes the member A 1101 and the member B 1102 and has a goal to transfer a document. In the fourth sub community 1134, the member A 1101 is a service provider and the member B 1102 is a service consumer.

Figure 12:
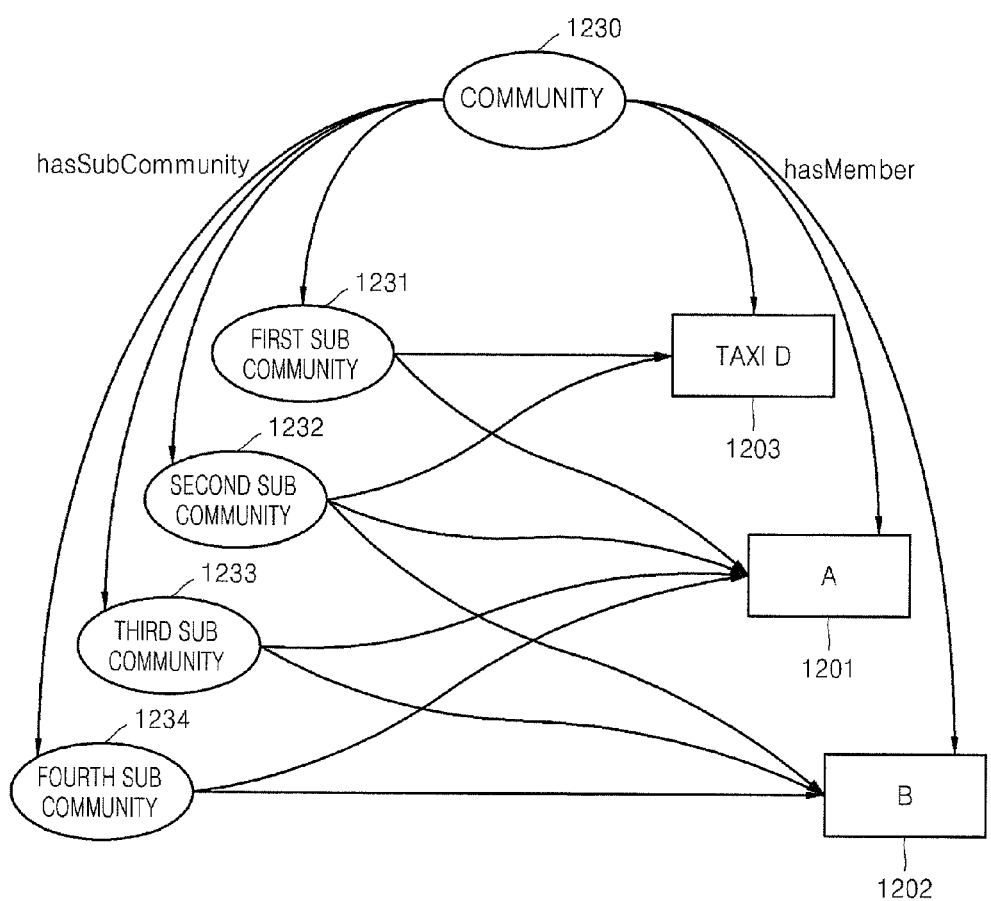
FIG. 12 is a diagram of a community to be generated in the process of FIG. 10 by using a plurality of sub communities, according to an embodiment of the present invention.

FIG. 12 is a diagram illustrating a community 1230 to be generated in the process of FIG. 10, by using a plurality of sub communities, according to another embodiment of the present invention. In FIG. 12, a goal of each of the plurality of sub communities is not illustrated and the community 1230 is represented with members belonging to each of the plurality of sub communities.

Figure 13A:
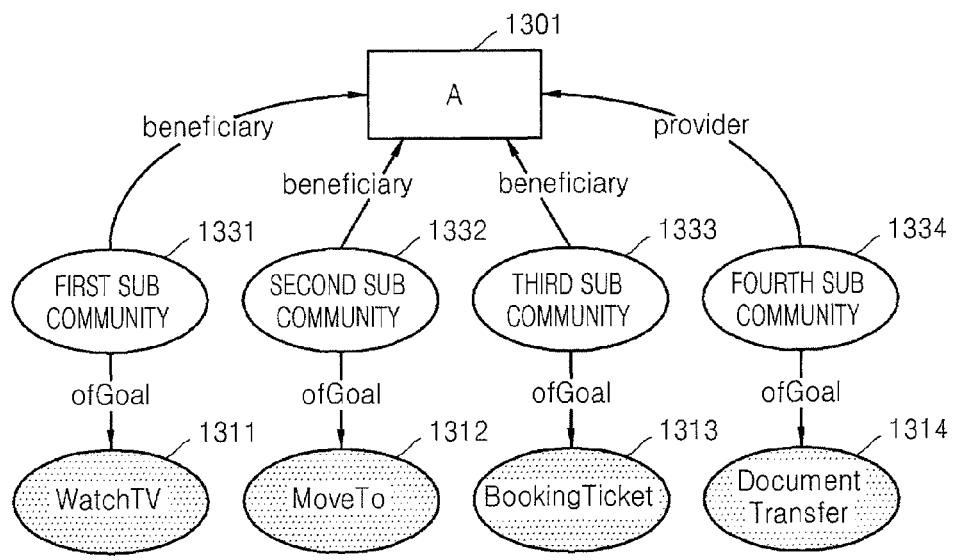
FIGS. 13A to 13C are diagrams of a community to be generated in the process of FIG. 10 by using different members thereof, according to embodiments of the present invention.
Figure 13B:
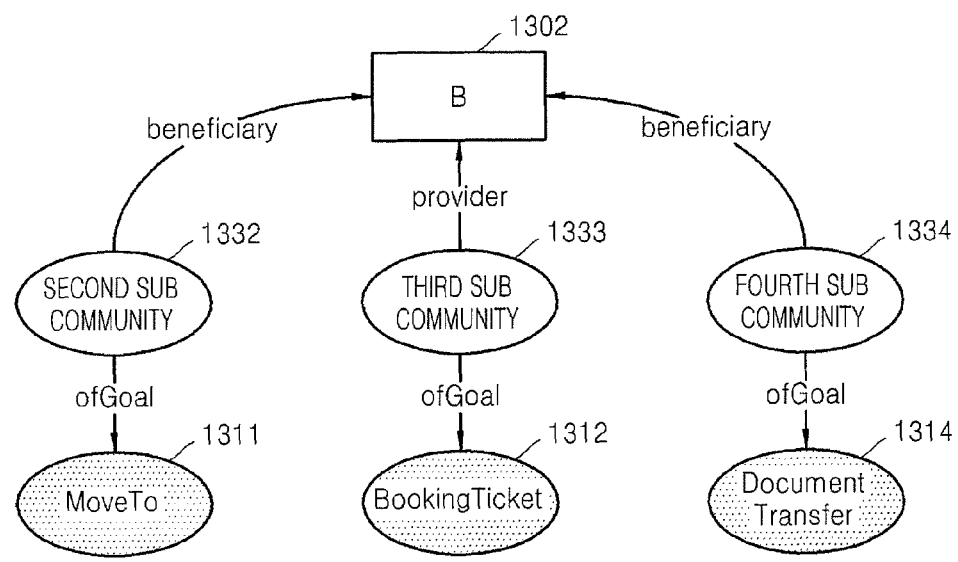
Figure 13C:
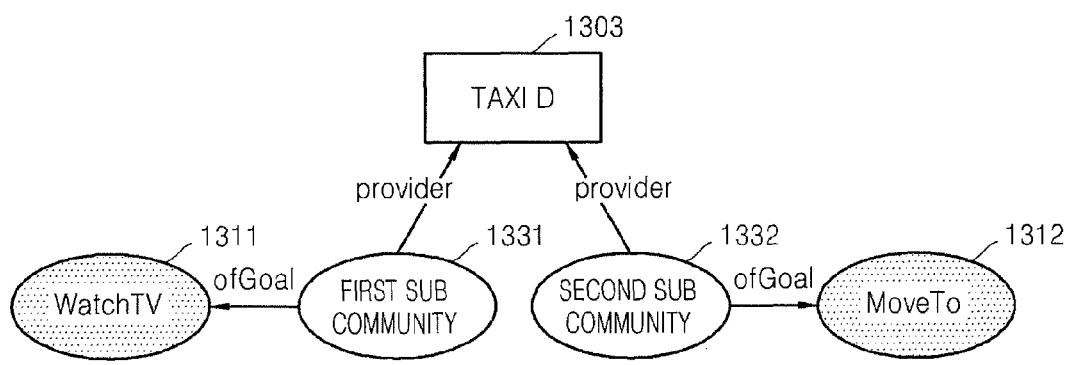

FIGS. 13A to 13C are diagrams illustrating a community to be generated in the process of FIG. 10 by using different members thereof, according to embodiments of the present invention.

Specifically, FIG. 13A illustrates the community by using a member A 1301, according to an embodiment of the present invention.

The member A 1301 belongs to a first sub community 1331, a second sub community 1332, a third sub community 1333, and a fourth sub community 1334. The member A 1301 is a service consumer in the first sub community 1331, the second sub community 1332, and the third sub community 1333, and is a service provider in the fourth sub community 1334.

FIG. 13B illustrates the community by using a member B 1302, according to another embodiment of the present invention.

The member B 1302 belongs to a second sub community 1332, a third sub community 1333, and a fourth sub community 1334. The member B 1302 is a service consumer in the second sub community 1332 and the fourth sub community 1334, and is a service provider in the third sub community 1333.

FIG. 13C illustrates the community by using a member Taxi D 1303, according to another embodiment of the present invention.

The member Taxi D 1303 belongs to a first sub community 1331 and a second sub community 1332. The member Taxi D 1303 is a service provider in the first sub community 1331 and the second sub community 1332.

Figure 14B:
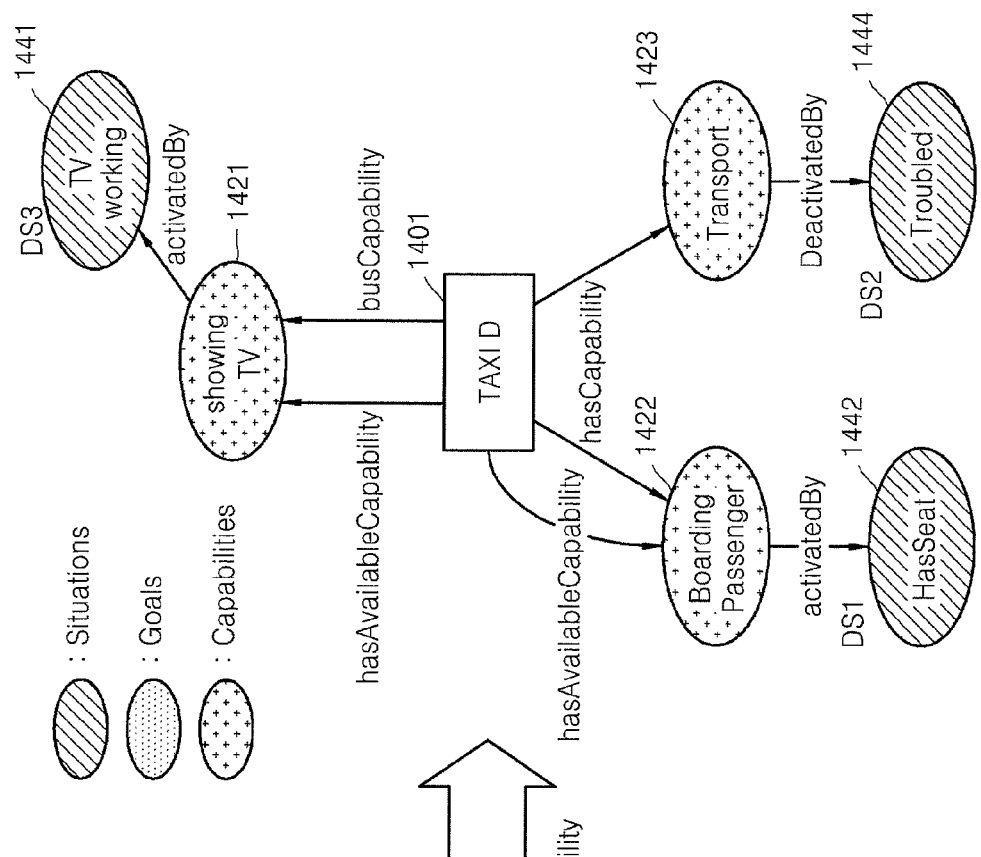
FIGS. 14A and 14B illustrate a change in a goal/capability model for a change in situational models of a member Taxi D belonging to a community to be generated in the process of FIG. 10, according to an embodiment of the present invention.
Figure 14A:
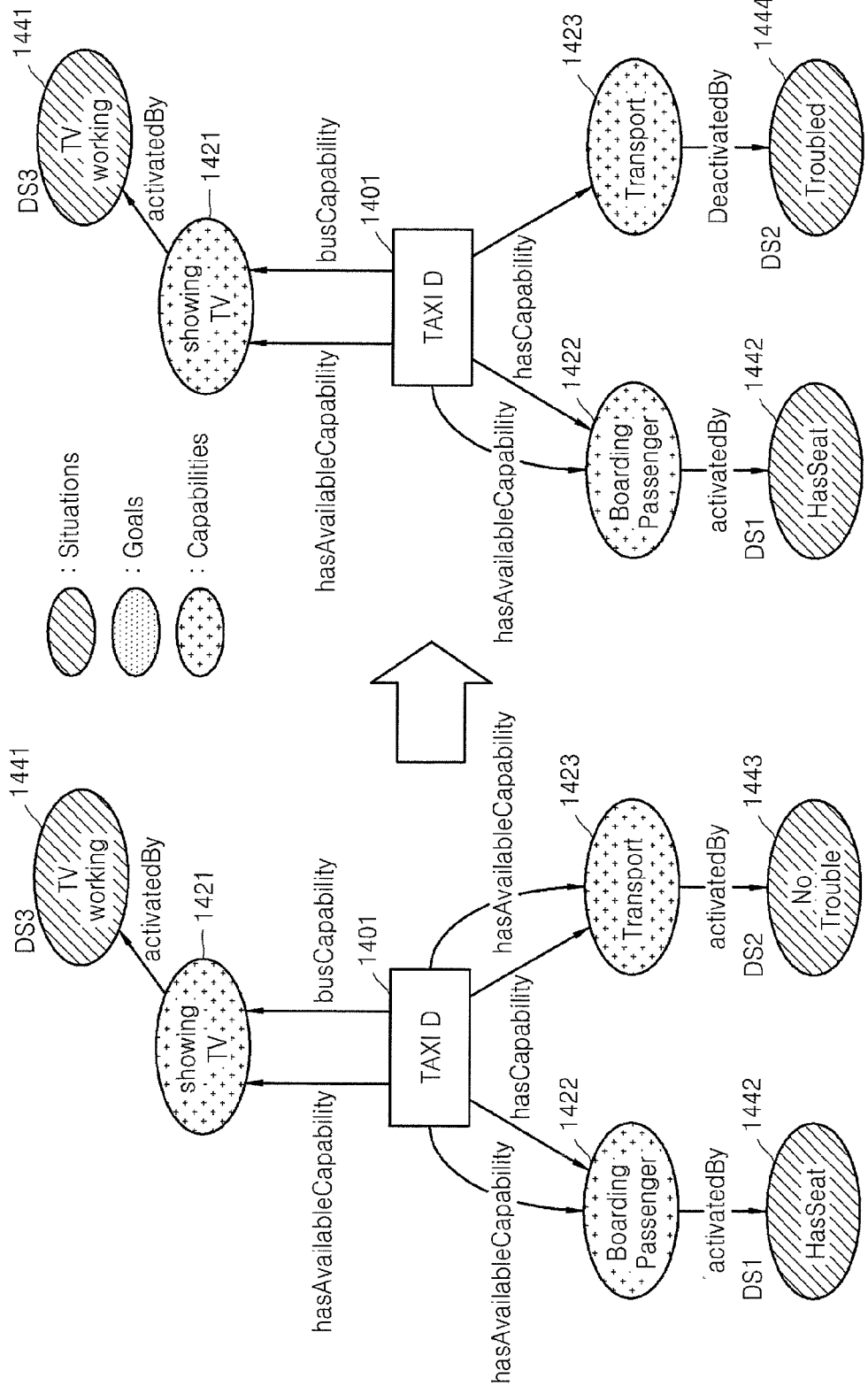

FIGS. 14A and 14B illustrate a change in a goal/capability model for a change in situational models of a member Taxi D 1401 belonging to a community to be generated in the process of FIG. 10, according to an embodiment of the present invention.

Referring to FIG. 14A, situational models of the member Taxi D 1401 include a 'TV working' class 1441 denoting that a TV is working, a 'HasSeat' class 1442 denoting that there is a vacant seat in the member Taxi D 1401, and a 'No Trouble' class 1443 denoting that the member Taxi D 1401 is working.

A list of capabilities of the member Taxi D 1401 based on these situational models includes a "showing TV" class 1421 denoting being capable of providing TV programs, a 'Boarding Passenger' class 1422 denoting being capable of providing a vacant seat to a passenger, and a 'Transport' class 1423 denoting being capable of transportation.

A change in situational models of a member may cause a change in goals or capabilities of the member. Particularly, FIG. 14B illustrates a situation in which a change in the situational models causes a change in the capabilities of the member.

Referring to FIG. 14B, the 'NoTrouble' class 1443 which is one of the situational models of the member Taxi D 1401 changes to a 'Troubled' class 1443 denoting that the member Taxi D 1401 has a problem. Thus, the 'Transport' class 1423 which is one of the capabilities of the member Taxi D 1401 is switched to a deactivated mode.

Figure 15:
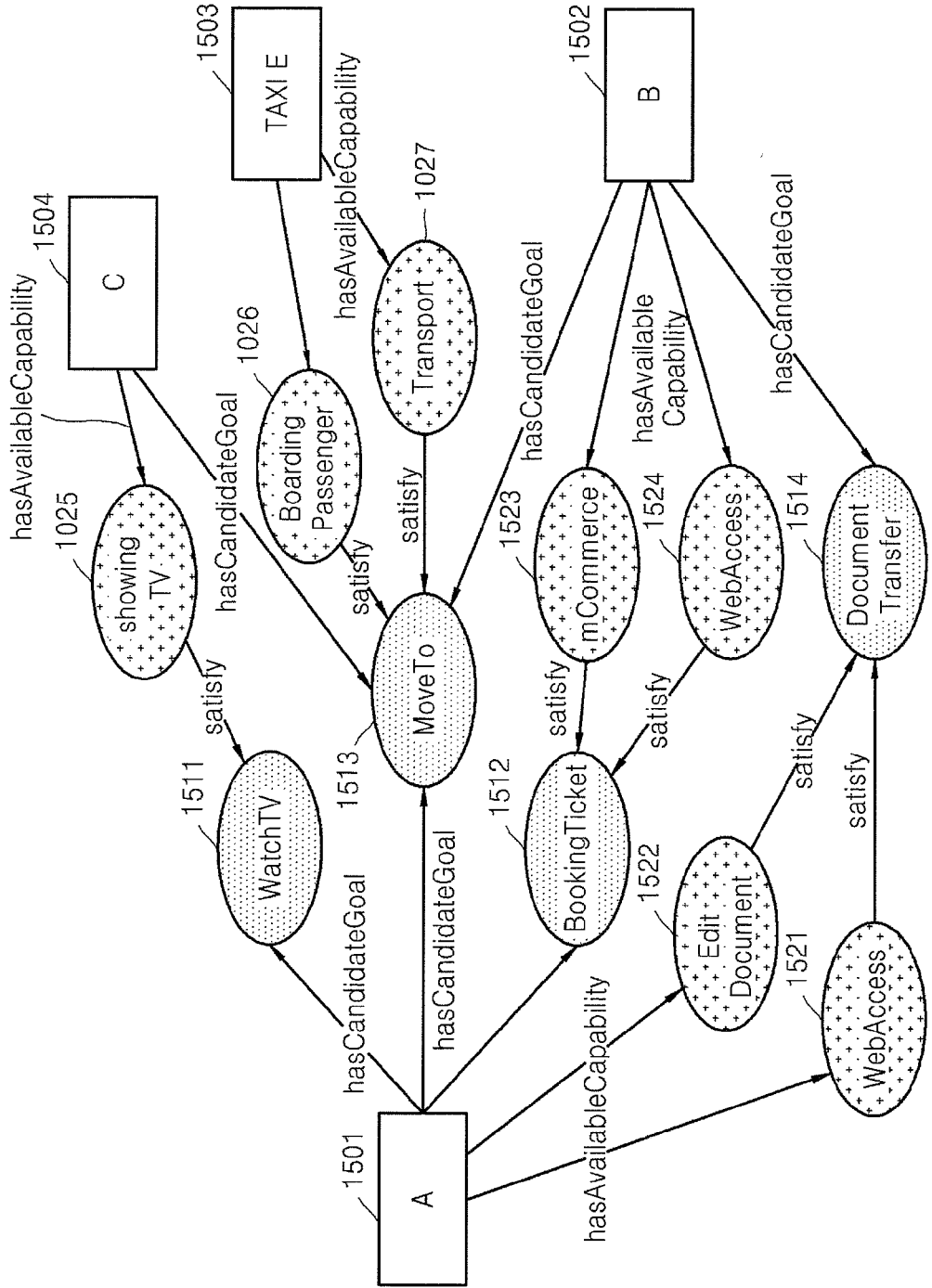
FIG. 15 illustrates a new community generated due to a change in situational models of a member Taxi D belonging to a community to be generated in the process of FIG. 10, according to an embodiment of the present invention.

FIG. 15 illustrates a new community generated when situational models of a member change in a community generated in the process of FIG. 10, according to an embodiment of the present invention.

When situational models of a member change, goals/capabilities of the member may also change. A change in the goals/capabilities of the member may prevent a community to which the member belongs from accomplishing at least one goal thereof. Thus, the validity determining unit 260 of FIG. 2 determines whether the community is valid when the situational models of the member change.

Referring to FIG. 14B, the 'Transport' class 1423 which represents one of the capabilities of the member Taxi D 1401 is deactivated due to the 'Troubled' class 1444. Thus, the member Taxi D 1401 cannot perform transportation. Accordingly, a goal to allow, for example, a member A 1501 and a member B 1502 of FIG. 15, to move to another location from among the goals of the community of FIG. 14B cannot be accomplished in the community of FIG. 14B.

In such situation, the validity determining unit 260 determines that the existing community is now invalid and requests the community generator 270 of FIG. 2 to generate a new community.

The community generator 270 searches for a member Taxi E 1503 that may provide a service to move to another location (a 'Transport' class 1027), and a member C 1504 that may provide a service to allow a TV to be watched (a 'showing TV' class 1025).

Then, the community generator 270 generates a new community to which the member A 1501, the member B 1502, the member Taxi E 1503, and a member C 1504 belong.

Figure 16:
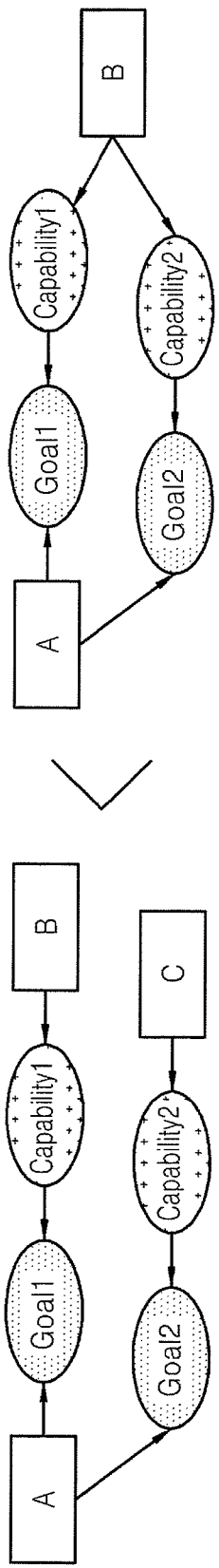
FIGS. 16 to 22 illustrate various processes of determining a candidate community by using a community generator of FIG. 2 and based on a community policy database (DB) of FIG. 2, according to embodiments of the present invention.

FIG. 16 illustrates a process of determining a candidate community by using the community generator 270 of FIG. 2 and based on the community policy DB 205 of FIG. 2, according to an embodiment of the present invention.

In FIG. 16, it is assumed that the community policy DB 205 prescribes that priority be assigned to a community with a least number of members. In order to accomplish goals of a community that includes a smaller number of members, the members are used to provide a larger number of services (or capabilities) or to have services (or capabilities) that can accomplish a larger number of goals.

In FIG. 16, a left community includes three members, and a right community includes two members. Therefore, the community generator 270 of FIG. 2 assigns priority to the right community.

Figure 17:
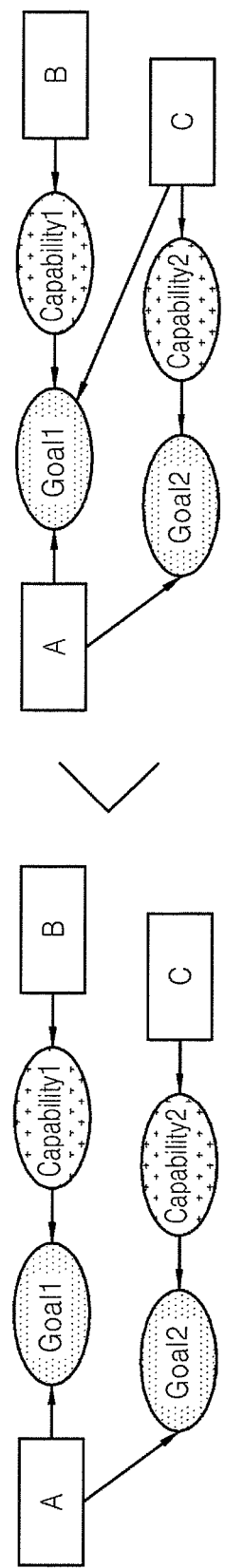

FIG. 17 illustrates a process of determining a candidate community by using the community generator 270 of FIG. 2 and based on the community policy DB 205 of FIG. 2, according to another embodiment of the present invention.

In FIG. 17, it is assumed that the community policy DB 205 prescribes that priority be assigned to a community with a large number of goals.

In FIG. 17, a left community may accomplish two goals, and a right community may accomplish three goals. Thus, the community generator 270 assigns priority to the right community.

Figure 18:
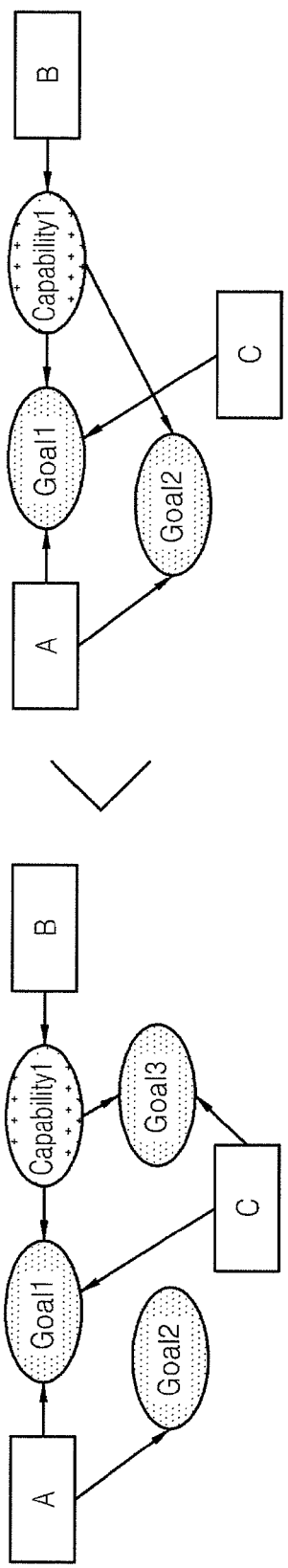

FIG. 18 illustrates a process of determining a candidate community by using the community generator 270 of FIG. 2 and based on the community policy DB 205 of FIG. 2, according to another embodiment of the present invention.

In FIG. 18, it is assumed that the community policy DB 205 prescribes that priority be assigned to a community in which accomplishing of a goal of a particular member, e.g., a member A, is secured.

In FIG. 18, in a left community, one of two goals of A is accomplished, but in a right community, both of two goals of A are accomplished. Thus, the community generator 270 assigns priority to the right community.

Figure 19:
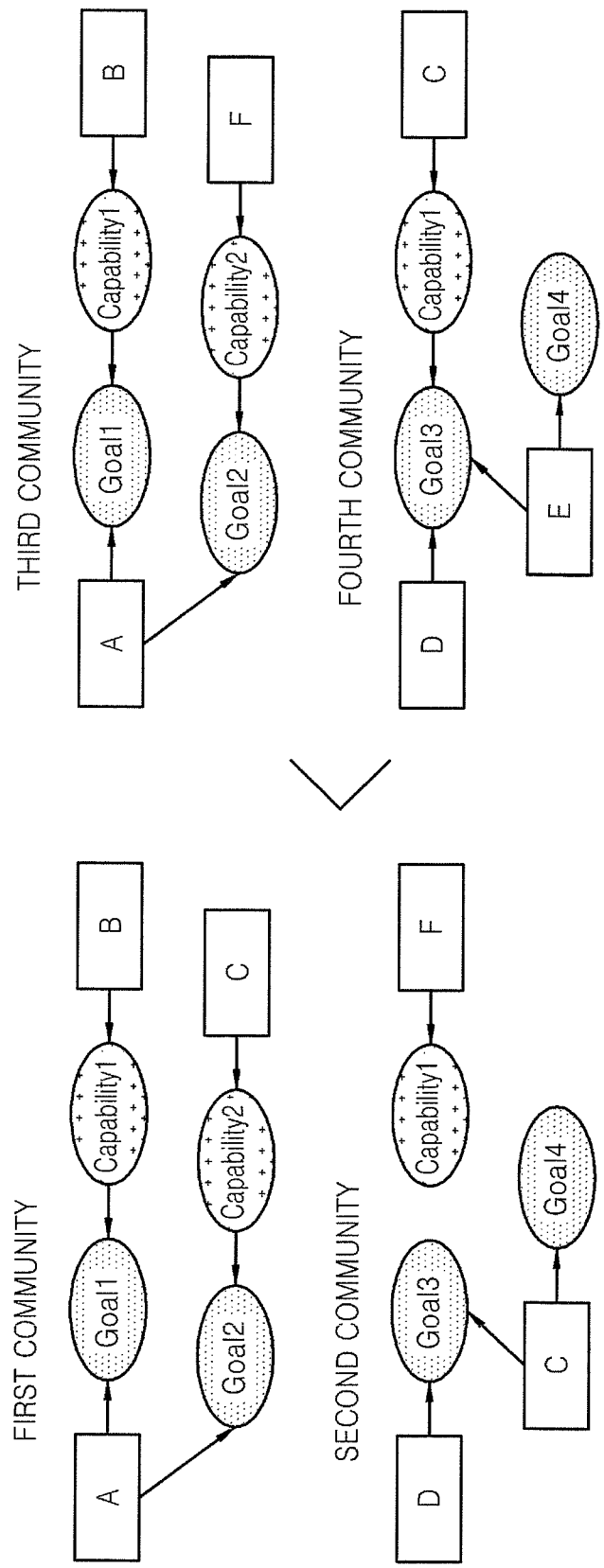

FIG. 19 illustrates a process of determining a candidate community by using the community generator 270 of FIG. 2 and based on the community policy DB 205 of FIG. 2, according to another embodiment of the present invention.

In FIG. 19, it is assumed that the community policy DB 205 prescribes that priority be assigned to a community such that the number of goals of which can be accomplished is a maximum number from among all communities.

Referring to FIG. 19, three goals may be accomplished in left communities, i.e., first and second communities, and four goals may be accomplished in right communities, i.e., third and fourth communities. Thus, the community generator 270 assigns priority to the third and fourth communities.

Figure 20:
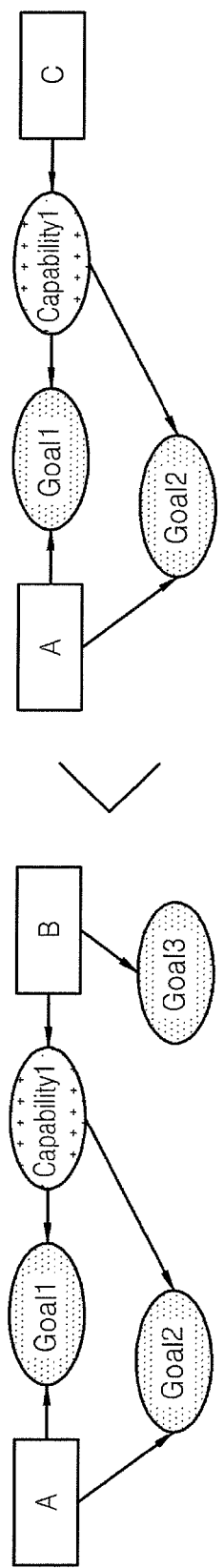

FIG. 20 illustrates a process of determining a candidate community by using the community generator 270 of FIG. 2 and based on the community policy DB 205 of FIG. 2, according to another embodiment of the present invention.

In FIG. 20, it is assumed that the community policy DB 205 prescribes that priority be assigned to a community such that the number of goals of which cannot be accomplished is a minimum number from among all communities.

One goal cannot be accomplished in a left community but all goals can be accomplished in a right community. Thus, the community generator 270 assigns priority to the right community.

Figure 21:
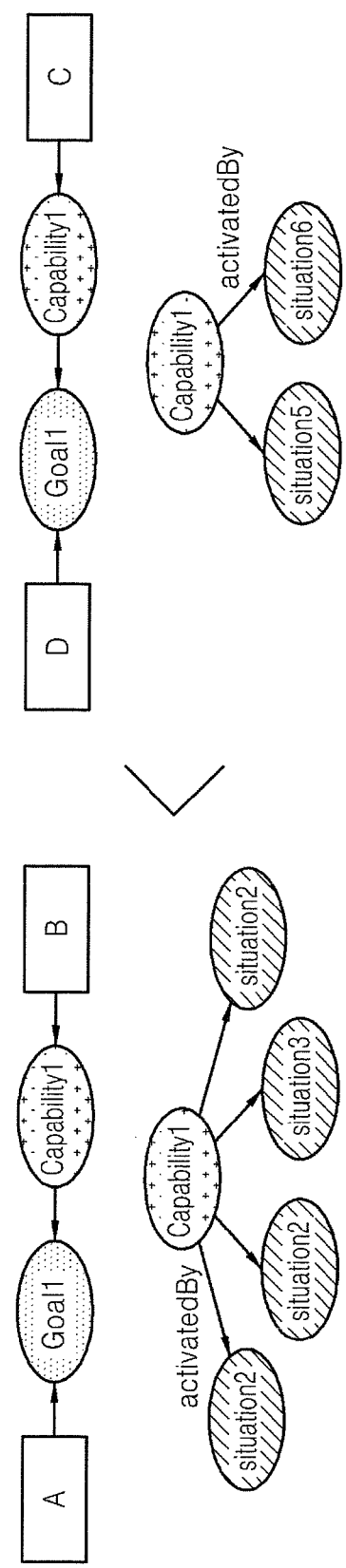

FIG. 21 illustrates a process of determining a candidate community by using the community generator 270 of FIG. 2 and based on the community policy DE 205 of FIG. 2, according to another embodiment of the present invention.

In FIG. 21, it is assumed that the community policy DB 205 prescribes that priority be assigned according to community stability. For example, priority may be assigned to a community, the validity of which is highly likely to be maintained even when situational models of a member belonging to the community change.

Referring to FIG. 21, in a left community, 'capability1' denotes a capability inferred from a combination of four situational models. Thus, 'capability1' in the left community is deactivated when at least one of the four situational models changes. On the other hand, in a right community, 'capability1' denotes a capability inferred from a combination of two situational models. Thus, 'capability1' in the right community is deactivated when at least one of the two situational models changes. That is, the right community is more stable than the left community, and thus, the community generator 270 assigns priority to the right community.

Figure 22:
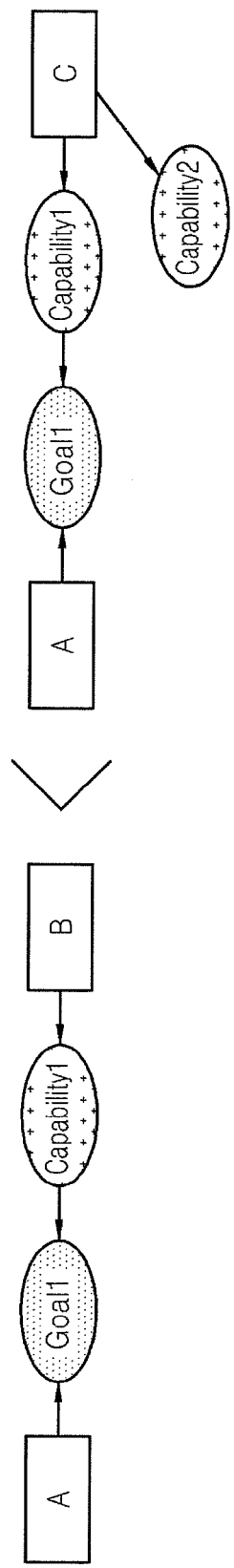

FIG. 22 illustrates a process of determining a candidate community by using the community generator 270 of FIG. 2 and based on the community policy DB 205 of FIG. 2, according to another embodiment of the present invention.

In FIG. 22, it is assumed that the community policy DB 205 prescribes that priority be assigned according to community stability. For example, priority may be assigned to a community, in which when one capability is deactivated, the capability is highly likely to be replaced with another capability.

Referring to FIG. 22, in a left community, no capability can be replace capability1, whereas in a right community, capability1 may be replaced with 'capability2'. Thus, the community generator 270 assigns priority to the right community.

However, the present invention is not limited to the community policies described above with reference to FIGS. 17 to 22, and a possibility of a contention between communities occurring, a possibility of a contention between goals of communities occurring, and whether members have an equal possibility of a goal being accomplished may further be considered.

Figure 23:
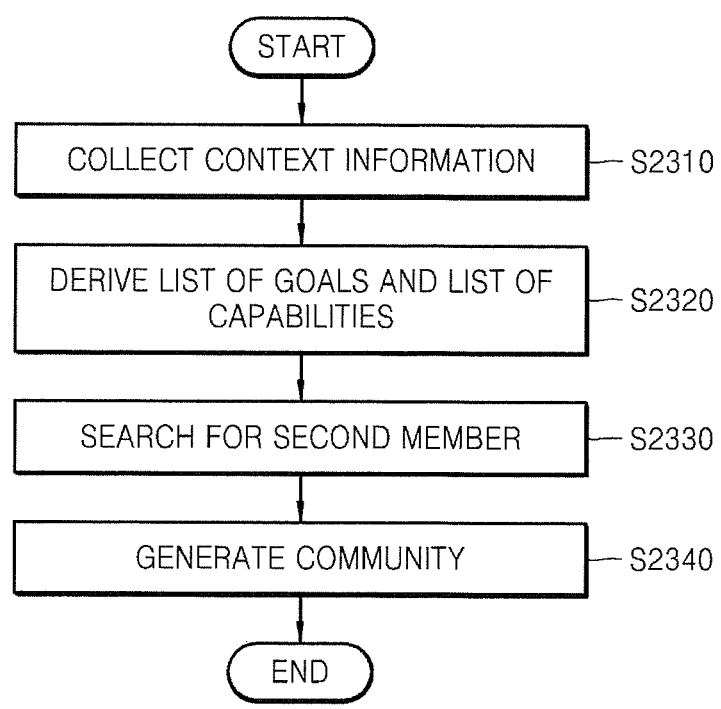
FIG. 23 is a flowchart of a process for generating a community, according to an embodiment of the present invention.

FIG. 23 is a flowchart of a process for generating a community according to an embodiment of the present invention.

In block S2310, context information related to a first member is collected.

In block S2320, a list of goals of the first member and a list of capabilities that the first member may have are generated based on the context information.

In block S2330, a second member (entity) that has a capability matching at least one goal listed in the list of goals or that has a goal matching at least one capability listed in the list of capabilities, is searched for.

In block S2340, a community to which the first member and the second member may belong is generated.

The above embodiments of the present invention may be embodied as a computer program. The computer program may be stored in a computer readable recording medium, and executed using a general digital computer. Examples of the computer readable medium include an electrical recording medium (e.g. RAM, ROM, flash memory, and such), a magnetic recording medium (a floppy disc, a hard disc, and such), an optical recording medium (a CD-ROM, a DVD, and such), and any non-transitory computer readable storage media.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to generate a community using a community generating system, the method comprising:
    collecting context information related to a first member and a second member;
    deriving a first list of goals that the first member wants to accomplish and a first list of capabilities that the first member may provide based on the context information related to the first member;
    deriving a second list of goals that the second member wants to accomplish and a second list of capabilities that the second member may provide based on the context information related to the second member;
    matching at least one capability from the first list of capabilities with at least one goal from the second list of goals or at least one capability from the second list of capabilities with at least one goal from a first list of goals;
    generating a community including the first member and the second member based on matching the at least one capability from the first list of capabilities with the at least one goal from the second list of goals or the at least one capability from the second list of capabilities with the at least one goal from the first list of goals;
    determining whether any contentions exists between an existing community and the generated community; and
    canceling the generated community in response to determining a contention exists between the existing community and the generated community.

2. The method of claim 1, further comprising:
    updating the context information related to the first member;
    determining whether the community is valid based on the updated context information; and
    modifying the community based on the updated context information.

3. The method of claim 1, wherein generating the community comprises:
    generating at least one candidate community including the first and second members; and
    determining one of the at least one candidate community as a final community based on an input signal.

4. The method of claim 1, wherein generating the community comprises:
    generating at least one candidate community including the first and second members; and
    determining one of the at least one candidate community as a final community based on one or more community policies to generate a community.

5. The method of claim 4, wherein determining the final community comprises determining a community that satisfies a highest-priority assigned goal listed in the list of goals from among the at least one candidate community as the final community.

6. The method of claim 4, wherein determining the final community comprises determining a community that maximizes the number of goals that are accomplished from among the at least one candidate community as the final community.

7. The method of claim 1, wherein generating the community comprises:
    determining whether the first member is to join an existing community to which the second member belongs; and
    allowing the first member to join the existing community based on matching the at least one capability from the first list of capabilities with the at least one goal from the second list of goals or the at least one capability from the second list of capabilities with the at least one goal from the first list of goals.

8. The method of claim 1, wherein deriving the list of goals and the list of capabilities comprises:
    generating a situational model corresponding to the first member based on the context information related to the first member and a situational model knowledge base (KB) that defines each situational model based on a combination of at least one piece of context information; and
    deriving the list of goals and the list of capabilities based on the situational model corresponding to the first member and an entity model KB that defines goals and capabilities based on a combination of at least one situational model.

9. The method of claim 1, wherein searching for the second member comprises searching for the second member based on a goal or a capability matching KB that defines a matching relationship between a goal and a capability to accomplish the goal.

10. The method of claim 1, further comprising controlling at least one of the first member and second member to accomplish a goal of the community.

11. The method of claim 1, wherein the community comprises at least one sub-community, wherein each sub-community comprises a goal, one or more service consumer that share the goal, and one or more service providers that provide a capability that matches the goal.

12. A community generating system, the system comprising:
    a context information collector configured to collect context information related to a first member and a second member;
    a list deriving device configured to:
        derive a first list of goals that the first member wants to accomplish and a first list of capabilities that the first member may provide based on the context information related to the first member, and
        derive a second list of goals that the second member wants to accomplish and a second list of capabilities that the second member may provide based on the context information related to the second member;

a matching device configured to match at least one capability from the first list of capabilities with at least one goal from the second list of goals or at least one capability from the second list of capabilities with at least one goal from the first list of goals;

a community generator configured to generate a community including the first member and the second member based on matching the at least one capability from the first list of capabilities with the at least one goal from the second list of goals or the at least one capability from the second list of capabilities with the at least one goal from the first list of goals; and validity determining unit configured to:
  determine whether any contentions exists between an existing community and the generated community; and
  cancel the generated community in response to determining a contention exists between the existing community and the generated community, wherein the context information collector and the community generator are implemented as a hardware device.

13. The system of claim 12, further comprising:
an update device configured to update the context information related to the first member;
a validity determining device configured to determine whether the community is valid based on the updated context information; and
a modification device configured to modify the community based on the updated context information.

14. The system of claim 12, wherein the community generator comprises:
a candidate community generator configured to generate at least one candidate community comprising the first and second members; and
a determiner configured to determine one of the at least one candidate community as a final community based on an input signal.

15. The system of claim 12, wherein the community generator comprises:
a candidate community generator configured to generate at least one candidate community comprising the first and second members; and
a determiner configured to determine one of the at least one candidate community as a final community based on one or more community policies to generate a community.

16. The system of claim 15, wherein the determiner is further configured to determine a community that satisfies a highest-priority assigned goal listed in the list of goals from among the at least one candidate community as the final community.

17. The system of claim 15, wherein the determiner is further configured to determine a community that maximizes the number of goals that are accomplished from among the at least one candidate community as the final community.

18. The system of claim 11, wherein the community generator is further configured to determine whether the first member is to join the existing community to which the second member belongs, and allow the first member to join the existing community based on a result of the determining.

19. The system of claim 12, wherein the list deriving device comprises:
a situational model determiner configured to determine a situational model corresponding to the first member based on the context information related to the first member and a situational model knowledge base (KB) that defines each situational model based on a combination of at least one piece of context information; and
a deriving device configured to derive the list of goals and the list of capabilities based on the situational model corresponding to the first member and an entity model KB that defines goals and capabilities based on a combination of at least one situational model.

20. The system of claim 12, wherein the search device is further configured to search for the second member, based on a goal or capability matching KB that defines a matching relationship between a goal and a capability to accomplish the goal.

21. The system of claim 12, further comprising a community execution device configured to control at least one of the first member and the second member to accomplish a goal of the community.

22. The system of claim 12, wherein the community comprises at least one sub-community, wherein each sub-community comprises a goal, one or more service consumers that share the goal, and one or more service providers that provide a capability that matches the goal.

23. A non-transitory, computer-readable medium storing a computer program that, when executed by a processor, causes the processor to:
collect context information related to a first member and a second member;
derive a first list of goals that the first member wants to accomplish and a first list of capabilities that the first member may provide based on the context information related to the first member;
derive a second list of goals that the second member wants to accomplish and a second list of capabilities that the second member may provide based on the context information related to the second member;
match at least one capability from the first list of capabilities with at least one goal from the second list of goals or at least one capability from the second list of capabilities with at least one goal from a first list of goals;
generating a community including the first member and the second member based on matching the at least one of the capability from the first list of capabilities with the at least one goal from the second list of goals or the at least one capability from the second list of capabilities with the at least one goal from the first list of goals;
determining whether any contentions exists between an existing community and the generated community; and
canceling the generated community in response to determining a contention exists between the existing community and the generated community.

* * * * *